(12) United States Patent
Takahashi et al.

(10) Patent No.: US 7,550,127 B2
(45) Date of Patent: *Jun. 23, 2009

(54) METHOD FOR REDUCING EXHAUST CARBON DIOXIDE

(75) Inventors: Tatsuhito Takahashi, Fukuyama (JP); Tsuneo Isoo, Fukuyama (JP); Makoto Kato, Fukuyama (JP); Haruyoshi Tanabe, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/712,258

(22) Filed: Feb. 28, 2007

(65) Prior Publication Data

US 2007/0154380 A1    Jul. 5, 2007

Related U.S. Application Data

(60) Continuation of application No. 10/898,491, filed on Jul. 22, 2004, now abandoned, which is a division of application No. 09/844,533, filed on Apr. 27, 2001, now Pat. No. 6,843,843, which is a continuation of application No. PCT/JP99/05972, filed on Oct. 28, 1999.

(30) Foreign Application Priority Data

Oct. 29, 1998  (JP)  .................. 10-324472
May 18, 1999   (JP)  .................. 11-137113

(51) Int. Cl.
  *C01F 11/18*  (2006.01)
(52) U.S. Cl. ...................... 423/432; 423/225
(58) Field of Classification Search .................. 423/432, 423/225
  See application file for complete search history.

(56) References Cited

U.S. PATENT DOCUMENTS

| | | | |
|---|---|---|---|
| 4,492,649 A | 1/1985 | Cheh et al. | |
| 5,113,792 A | 5/1992 | Jones et al. | |
| 5,455,013 A | 10/1995 | Shibata et al. | |
| 5,803,660 A | 9/1998 | Warren et al. | |
| 5,908,265 A | 6/1999 | Mostkoff | |
| 6,264,836 B1 | 7/2001 | Lantis | |
| 6,387,174 B2 | 5/2002 | Knopf et al. | |
| 6,431,792 B1 | 8/2002 | Barnes | |
| 6,699,318 B1 | 3/2004 | Virtanen | |

FOREIGN PATENT DOCUMENTS

| | | |
|---|---|---|
| EP | 0 554 873 A1 | 8/1993 |
| EP | 0 610 781 A1 | 8/1994 |
| FR | 2735804 | 12/1996 |
| JP | 55-42216 A | 3/1980 |
| JP | 3-32721 A | 2/1991 |
| JP | 4-243910 A | 9/1992 |
| JP | 6-180391 A | 6/1994 |
| JP | 07-048186 A | 2/1995 |
| JP | 7-88362 A | 4/1995 |
| JP | 7-185319 A | 7/1995 |
| JP | 7-265688 A | 10/1995 |
| SU | 1084321 | 4/1984 |
| WO | WO 99/36361 A | 7/1999 |

OTHER PUBLICATIONS

A. Kaminskas, "Use of Dolomitic Limestone for the Manufacture of Lime-Sand Bricks and Other Autoclave-Cured Silicate Building Materials. II. Study of the Hydration Curing of Magnesium Oxide in the Presence of Carbonate Ions", *TIZ*, (1987), 111(1), 36-41.
"Marble and Stone from Slag", *Am. Contractor*, (1907), 28, 45.
Aharon Miroz, "The Miroz System for the Construction of Artificial Coral Reefs Using Coral Fragments".
Jim Hardie, Fishing, "Private Artificial Reef May be in Your Fishing Future", www.artificialreefs.org., Mar. 22, 1998.

*Primary Examiner*—Stuart Hendrickson
(74) *Attorney, Agent, or Firm*—Frishauf, Holtz, Goodman & Chick, P.C.

(57) ABSTRACT

A method for effectively absorbing and removing $CO_2$ in an exhaust gas generated during an industrial process for reducing the amount of $CO_2$ that is exhausted into the atmosphere. The exhaust gas containing $CO_2$ is blown into an agglomerate of solid particles containing CaO and/or $Ca(OH)_2$ so that the $CO_2$ is in contact with the agglomerate for fixing the $CO_2$ in the exhaust gas as $CaCO_3$, thereby reducing the $CO_2$ concentration in the exhaust gas. Preferably, the solid particles contain water, and more preferably, the solid particles contain surface adhesive water.

16 Claims, 10 Drawing Sheets

METHOD FOR REDUCING EXHAUST CARBON DIOXIDE

CROSS REFERENCE TO RELATED APPLICATIONS

This application is a continuation application of application Ser. No. 10/898,491 filed Jul. 22, 2004 (abandoned), which is a divisional application of application Ser. No. 09/844,533 filed Apr. 27, 2001 (U.S. Pat. No. 6,843,843), which is a continuation application of International application No. PCT/JP99/05972 (not published in English), filed on 28 Oct. 1999, the entire contents of which are incorporated by reference herein.

FIELD OF THE INVENTION

The present invention relates to a method for reducing $CO_2$ concentration in exhaust gas generated in an industrial process and others, and reducing the amount of exhausting $CO_2$ in an atmospheric air. Further, the present invention relates to a water immersion block for seaweed and algae planting places, fish gathering rocky places or riverbeds, and a method for making the same. Herein, the above mentioned "seaweed and algae planting places" designate groups or communities of marine algae (algae, seaweed and the like) growing in the sea bottom.

BACKGROUND OF THE INVENTION

Recently, from the viewpoint of preventing world warming, it has been demanded to reduce the amount of generated $CO_2$ on a global scale. At the congress of the world warming prevention which took place at Kyoto in December 1997, a protocol for the reduction of the exhaust gas was adopted. This protocol established a reduction target in 2010, aiming at reducing at least 5% of a standard with respect of 1990 of the exhaust amounts of greenhouse effect gases ($CO_2$, $CH_4$, $N_2O$ and others) of all advanced countries. In accordance with the protocol, Japan has been assigned a duty of lowering 6% of the amount of issuing exhaust gases.

$CO_2$ accounts for 64% of the contribution degree per the greenhouse effect gas with respect to world warming, and is mainly exhausted by using fossil fuel. In Japan, 95% of the greenhouse effect gas generated by social or economical activities is $CO_2$, and more than 90% thereof is accompanied with use of energy. Accordingly, a measure for preventing the world from warming will be to chiefly control $CO_2$ exhausted in conjunction with the use of energy.

With respect to the control of exhausting $CO_2$ accompanied with the use of energy, for example, the iron and steel business world which accounts for about 11% of the final energy consumption of Japan, projects a self-imposed behavior plan toward 2010, and proclaims in this plan a 10% reduction, in comparison with 1990 of the energy consumption in the production process in 2010. Further, as an actual measure thereto other than energy reduction, included are the blowing of waste plastics as reducing agents into blast furnaces, usage of non-used energy in neighboring areas, or contribution to energy saving by making products or by-products.

However, in the present high degree industrialized society, there is per se a limit in the control of using energy which is related to the cutting of the exhaust of $CO_2$, and it is not always easy to accomplish a target of cutting $CO_2$ exhaust only with the control of the amount of energy used.

Accordingly for accomplishing the target of cutting $CO_2$ exhaust, it is considered to be necessary to take such a measure from both sides of cutting the $CO_2$ generated amount, as well as removing $CO_2$ from the generated gas (exhaust gas). However, an effective method which removes $CO_2$ from the exhaust gas on an industrial scale is not yet conventionally known.

As a part of usefully using slag generated in the iron and steel making process, it has been tried to make use of the slag as a seawater immersion block for algae planting places or fish gathering rocky places.

As main embodiments of utilizing slag as such materials, there is a method of utilizing massive slag for algae planting places as it is, and another method of utilizing slag as agglomerates for fish gathering rocky places. However these methods are involved with problems as discussed herein.

In the former method, Ca content contained in slag is dissolved into the sea to probably heighten the pH in the neighboring seawater. The obtained massive slag in the iron-steel making process is suited as a block for such as algae planting places due to surface properties in comparison with concrete products. However, as block for the algae planting places, the massive slag has functions (adhering property of sea algae or rearing property) only of a similar degree to a natural block, and does not have a special function of accelerating the growing of sea algae.

The slag generated in the iron-steel making process contains much iron content such as metals (grain iron), and ordinarily it is broken to desired sizes for recovering the iron content in the slag for recycle in the iron-steel making process. Slag for algae planting places necessitates sizes of a certain degree, and slag broken for recovering the metal is scarcely used. If use is made of the massive slag as a block for algae planting places, the recovery of the metal useful as iron and steel sources can hardly be practiced.

In contrast, if massive slag containing much metal is immersed into the sea as it is for use as a block in algae planting places, the iron content in the slag is oxidized, depending on sea areas, to cause a shortage of oxygen in the seawater, and further by dissolution of the iron content; the iron content might be excessively supplied in the sea water. For avoiding such problems, the metal in the slag should be perfectly removed. Since the slag content and the metal generally exist in a mixture as if entwined, the slag must be more finely pulverized than the case of the above mentioned metal recovery in order to completely remove the metal. Such finely pulverized slag cannot be used as materials to be immersed in the sea water for the algae planting places.

On the other hand, the latter method uses slag as an agglomerate of a concrete made pre-cast body, and so there seldom occurs a problem of the case that the massive slag is immersed in the sea as it is. However materials available by this method are concrete products whose surfaces are composed of cement mortar, and which therefore cannot exhibit even the properties of massive slag (for example, uneven surface property) which are expected to display performance per se as for algae planting places.

Recently, there has arisen a tendency towards maintenance and improvement of natural circumstances of rivers including living circumstances of creatures such as fishes or shells, and as a part of the tendency, for example, it has been tried to repair riverbeds to be suited to water living creatures (fishes, shells, water insects and others) or water plants (algae, water grass and others) to inhabit and live. In the rivers, creatures' living and resting spaces called biotopes are created with blocks and, accordingly, much uneven riverbeds made by blocks are better for water living creatures. Relatively large spaces among immersed or half-immersed massive blocks on the riverbeds or small spaces among small blocks laid thereon are important living spaces (biotopes) for water living creatures. Blocks on the riverbeds are also places for water plants to live, and for rearing water plants. Blocks are therefore important.

For repairing riverbeds as a part of maintenance or improvement of the natural circumstances of rivers, the sinking or laying of blocks in appropriate forms (for example, placing of large massive blocks, sinking or laying of middle massive or small blocks on the riverbeds) may be a useful means for arranging the circumstances for fish to live or inhabit. For repairing riverbeds, enormous amount of blocks are required. It probably causes destruction of nature to supply natural blocks from other places, and since natural blocks are not cheap, the construction cost is increased.

For usefully using slag generated in the iron and steel making process, it has been tried to utilize slag as sea water immersion blocks for fish gathering rocky places. Concerning blocks for sinking in rivers, slag generated in the iron and steel-making process should be considered.

As discussed hereinabove, with respect of main embodiments for utilizing slag to be immersed in rivers, there is considered a method of using the slag as it is as an immersion block and another method of using the slag as concrete pre-cast agglomerates.

However these methods have problems as discussed hereinabove.

In the former method, the Ca content in the slag is dissolved into the water to probably heighten the pH in the river water. Since the slag generated in the iron and steel making process contains much metal (grain iron), if massive slag is immersed in the water as it is, grain iron is oxidized, and depending on water ranges, a shortage in oxygen might occur in neighboring rivers. For avoiding such problems, the metal in the slag should be completely removed. Since the slag content and the metal generally exist in a mixture as if entwined, the slag must be more finely pulverized than in the case of the above mentioned metal recovery in order to completely remove the metal. Such finely pulverized slag cannot be used as materials to be immersed in the sea water for algae planting places.

On the other hand, as in the latter method, if the slag is used as an agglomerate of a concrete made pre-cast body, since the base is made of concrete, the properties of the massive slag (for example, uneven surface property) which are expected to display performance as an immersion block in the rivers cannot be displayed. The concrete has a high pH (ordinarily, about a pH of 12 to 12.5), so that it increases the pH in the neighboring river water or delays growth of algae.

It has recently been recognized to prepare fish ways for fishes to move to upstream or downstream or to go up in dams or barrages, and repairs therefore have been carried out. The fish way is provided with a waterway (usually, having a width of about 2 to 5 m) for forming flows for fish to move in parts of the dam or barrage, and known are slant paths or stepwise paths. Conventionally ordinary fish ways are made by cutting parts of the dam or barrage in the water path encircled with the concrete.

Thus, the conventional fish way has no obstacle for fish to move as long as no problems exist in water flowing speed, water bottom obliquity or steps. However, since the concrete-made fish way has a smooth bottom, it is difficult for water living creatures such as algae to live, and there are problems for water living plants (for example, crusts or water living insects) relating to moving because of the catching with their claws on the riverbed (surface projections as a block for water living plants). For these problems, there is a method of structuring the fish way with a foam concrete to make fine indentations on the bottom of the fish way, however the construction cost is high with less practicability. In either way, the concrete has a high pH, which is not preferable for water living creatures moving on the riverbed.

Algae planting places are for breeding sea living plants and creatures in coastal and sea areas, and are indispensable as living places for useful fish and shellfish, rearing marine algae, laying eggs of fish and shellfish, breeding fry and small fish, or baiting. In addition, recently, nitrogen or phosphorus in the seawater are taken in by marine algae or other living creatures through the food cycle or chain in the algae planting places, otherwise suspension materials subside in the algae planting places. Thus, a water purifying action has been noticed.

However, nowadays, the algae planting places continue to rapidly fade or decline by influences of reclaiming coasts or corruption of the seawater. In particular, recently, in many coastal or sea areas, a big problem of so-called "shore burn" phenomena occurs. It has therefore been demanded to establish an algae place creation act for recovering algae planting places.

Algae creating methods conventionally carried out are roughly divided in the following two ways.

(1) At places where algae planting places are desired, bases for rearing marine algae (mainly, natural blocks or concrete blocks) are laid, and seeds and saplings of marine algae or mother algae are transplanted, and managed for rearing them as required.

(2) Places environmentally easy to become algae living places, that is, such places suitable for creating the algae places in view of circumstances as water depth, water quality or ocean current, which are within reach of spores of marine algae from existing algae places, are selected, and the bases are laid there. Algae places are thus created which are maintenance free (transplanting or rearing managing are not basically done).

Of these methods, the method (1) is advantageous in wide selecting ranges for creating the algae places, however, basically all of the creations are artificial, and it is necessary to fully manage taking-roots or rearing of transplanted seeds and saplings, for which a lot of time and tremendous cost are taken. This method is absolutely unsuited to large scale creations of algae places.

On the other hand, as the method (2) creates algae places which are maintenance free, other than laying the bases, it is advantageous in that it takes less time and cost, in comparison with the method (1). However, this method is short with respect of general purpose uses because of limited places to become algae places. According to a certain report for creating an algae place by the method (2), at a proper period in a place which does not naturally become an algae place, it is preferable to select a place within 100 m from an existing algae place, taking into consideration the reach of spores or seeds from existing algae places. Accordingly, it is assumed that this method is difficult to create algae places at places where circumferentially whole algae places have been faded by shore burn.

SUMMARY OF THE INVENTION

It is a first object of the invention to provide a method that effectively absorbs and removes $CO_2$ in an exhaust gas generated in an industrial process for reducing an amount of exhausting $CO_2$ into the atmospheric air.

The inventors made detailed investigations on materials of absorbing $CO_2$ and a method of using the same in order to find a method which effectively absorbs and removes $CO_2$ in the exhaust gas on an industrial scale. As a result, they found that as the $CO_2$ absorbing material, optimum was an agglomerate of solid particles containing CaO such as slag or concrete. The inventors also found that by blowing exhaust gas containing $CO_2$ in an agglomerate of the solid particles to be in contact with the exhaust gas, and especially preferably by blowing the exhaust gas, under the condition that the gas dissolves into the suitable amount of water content and the successive reaction (more preferably, surface adhesive water of the solid particles) to contact with the exhaust gas, it was possible to fix $CO_2$ in the exhaust gas as $CaCO_3$ in the solid particles and effectively absorb and remove $CO_2$.

The present invention has been realized on the above-mentioned findings and is described as follows.

[1] A method for reducing an exhaust carbon dioxide comprising the steps of:
 preparing agglomerates of solid particles containing at least one compound selected from the group consisting of CaO and $Ca(OH)_2$;
 contacting an exhaust gas containing $CO_2$ with the agglomerates of the solid particles in a reaction chamber, the solid particles having a film of adhesive water on a surface of the solid particles;
 fixing $CO_2$ in the exhaust gas as $CaCO_3$ to reduce $CO_2$ in the exhaust gas.

[2] The method according to [1], wherein the agglomerates of the solid particles are obtained by pulverizing materials containing CaO and/or $Ca(OH)_2$ into grain and/or rough grain.

[3] The method according to [1] or [2], wherein the step of contacting the exhaust gas comprises contacting by blowing the exhaust gas into the agglomerates of the solid particles.

[4] The method according to [3], wherein the exhaust gas containing $CO_2$ is blown into the agglomerates of the solid particles from one direction.

[5] The method according to [1]-[4], wherein the water content in the agglomerates of the solid particles is from 3% to 20%.

[6] The method according to [1]-[5], wherein a grain size Of the solid particles is substantially 5 mm or less.

[7] The method according to [1]-[6], wherein the temperature of the exhaust gas to be introduced into the reaction chamber is at the boiling point of water or lower within the reaction chamber.

[8] The method according to [1]-[7], wherein the temperature in the reaction chamber is at the boiling point of water or lower.

[9] The method according to [1]-[8], wherein the temperature of the agglomerates of the solid particles is the boiling point of water or lower within the reaction chamber.

[10] The method according to [1]-[9], wherein the step of contacting the exhaust gas containing $CO_2$ with the agglomerates of the solid particles comprises contacting a pressurized exhaust gas with the agglomerates of the solid particles.

[11] The method according to [1]-[10], further comprising the step of saturating $H_2O$ in the exhaust gas, prior to contacting the exhaust gas with the agglomerates of the solid particles.

[12] The method according to [1]-[11], wherein the agglomerates of the solid particles are at least one selected from the group consisting of a slag generated in an iron-steel making process and a concrete.

[13] The method according to [1]-[11], wherein the solid particles of the agglomerates are at least one selected from the group consisting of a slag generated in an iron-steel making process and a concrete.

[14] The method according to [1]-[11], wherein the agglomerates of the solid particles are at least one selected from the group consisting of a slag generated in an iron-steel making process, a concrete, a mortar, a glass, an alumna cement, and a CaO containing refractory.

In the invention, CaO and $Ca(OH)_2$ contained in the solid particles are sufficient with those contained as at least one part of the composition of the solid particles, and accordingly, concerning other than CaO and $Ca(OH)_2$ as mineral, there are also included those existing in the solid particles as one part of the composition such as $2CaO.SiO_2$, $3CaO.SiO_2$ or glass.

It is a second object of the present invention to provide a water immersion block. The immersion block is excellent for rearing algae and breeding fish and shellfish without heightening the pH in seawater or river water. The present invention also provides a method of making the same, and a further method of building an algae planting place using a water immersion block.

For accomplishing the above-mentioned object, the present invention provides a water immersion block for immersion in water made by a method comprising the steps of:
 preparing a mixture comprising grain like slag generated in an iron-steel making process; and
 introducing carbonation to said mixture to generate a carbonized substance, and making the mixture massive with a binder of the generated carbonized substance.

Blocks made by this method for sinking in the water may be used in seawater or in the fresh water of rivers.

The grain like slag may be at least one selected from the group consisting of grain like slag, rough grain like slag and small massive slag, otherwise the slag may be grain like or rough grain like slag having been passed through a metal removing treatment.

Further, the invention provides a method of making immersion blocks for immersion in water comprising the steps of:
 preparing a mixture composed of grain like slag generated in the iron-steel making process;
 forming layers filled up with said mixture; and
 causing a carbonation reaction in the mixture in a packed bed by using carbon dioxide so as to make the mixture massive.

The step of forming the packed bed may depend on forming mountains by piling the mixture.

The invention provides a method of building algae planting places comprising the steps of:
 temporarily sinking weighty materials on existing algae planting places, and planting to rear marine algae on the surface of the weighty materials;
 recovering the weighty materials and moving them as seeding materials to places for planting algae; and
 arranging other materials for planting marine algae around the seeding materials and increasing the marine algae on the seeding material onto other seeding materials.

The above mentioned steps are only one example, and may not necessarily follow the above method.

DESCRIPTION OF THE PREFERRED EMBODIMENTS

Figure 1:
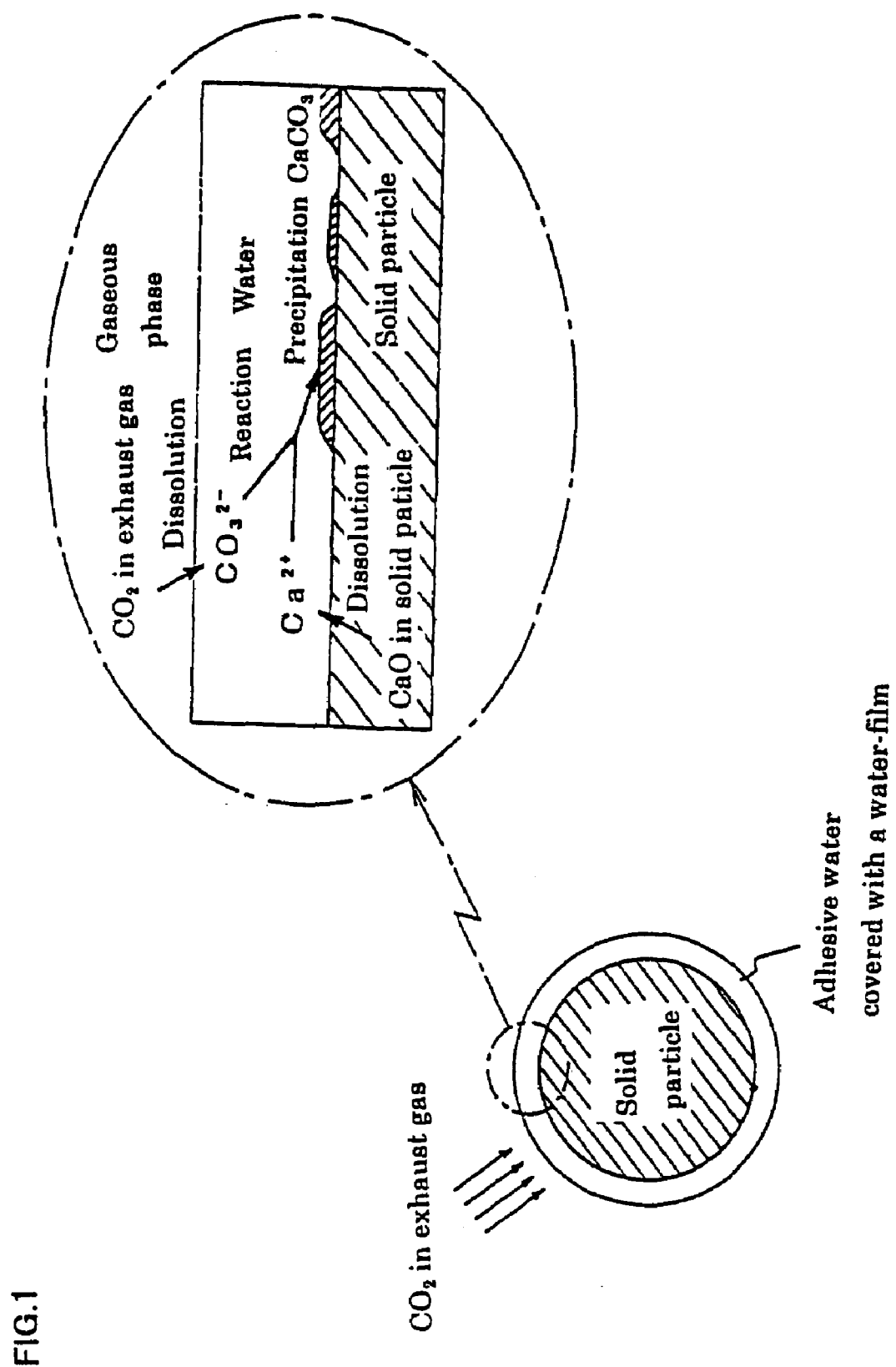
FIG. 1 is a schematic drawing assuming a mechanism that $CO_2$ in the exhaust gas is absorbed and fixed on the surface of the solid particle containing CaO.

A first embodiment for carrying out the present invention is as follows. Namely, the first embodiment uses, as a $CO_2$ absorbing material, the agglomerate of solid particles containing CaO and/or $Ca(OH)_2$ such as slag or concrete, $CO_2$ in the exhaust gas is absorbed and removed by means of contacting the $CO_2$ containing exhaust gas with the agglomerate of solid particles for fixing $CO_2$ in the exhaust gas as $CaCO_3$ in the solid particles by the following reaction. In this embodiment, as a method for contacting the exhaust gas, it is preferable to blow the exhaust gas into the agglomerate of solid particles, and more preferable to blow the exhaust gas from one direction. The exhaust gas can be blown from an upper side, from a lateral side and from a lower side. However, blowing from the lower side is easier to handle this method.

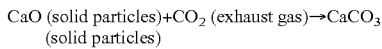

CaO (solid particles)+$CO_2$ (exhaust gas)→$CaCO_3$ (solid particles)

Conventionally, the agglomerate of solid particles containing CaO as slag is hardened by a carbonation reaction with $CO_2$, and employs the hardened material for architectural or civil engineering. The present invention utilizes the carbonation reaction between $CO_2$ and the agglomerate of CaO containing solid particles for reducing $CO_2$ in the exhaust gas, which is quite a novel concept in contrast to the prior art. The method of the present invention has been established especially for reducing carbon dioxide.

In the first embodiment, the agglomerates of the solid particles containing CaO are used. The agglomerates of the solid particles are contacted with the exhaust gas containing $CO_2$. $CO_2$ in the exhaust gas is fixed as $CaCO_3$ with the solid particles. In the first embodiment, it is preferable to contact the exhaust gas with the solid particles through an appropriate amount of the water content contained in the solid particles. It is more preferable to contact the exhaust gas with the solid particles under the condition where the water is adhered to the surface of the solid particles (water film). The above-mentioned contacting methods make it possible to effectively heighten the absorbing rate of $CO_2$ in the exhaust gas by the solid particles. Therefore, in the first embodiment, it is preferable that the main solid particle comprising the agglomerate of the solid particle contains water, and it is more preferable to have surface adhesive water.

In the above-mentioned preferable embodiment, especially in case that the solid particle contains surface adhesive water, the reaction is as follows. That is to say, the reaction is between $CO_2$ in the exhaust gas and the solid particle. In other words, the reaction is between a Ca component (Ca ion) dissolving (diffusion) into the surface adhesive water from the solid particle and carbon dioxide component dissolved into the water content adhered on the surface out of the exhaust gas. It was found that the reaction with $CO_2$ in the surface adhesive water of the solid particle was especially effective for absorbing and fixing $CO_2$.

At first, the inventors considered that in a method of reacting $CO_2$ in an exhaust gas with Ca in solid particles for fixing $CO_2$ as $CaCO_3$ in the solid particles, $CaCO_3$ would be precipitated on the whole surface of the solid particles as the reaction progressed, and as a result of preventing the diffusion of Ca ions from the solid particles, a $CO_2$ absorbing efficiency of a high level to be practiced on an industrial scale could not be expected. However, absolutely contrary to their expectations, it was found that if the reaction with $CO_2$ was carried out under the condition where the water content existed in the solid particles, in particular under the condition where the water was adhered to the surface of the solid particles, $CO_2$ could be absorbed at an extremely high efficiency. The reasons therefore are not clear, however, the following reasons may apply.

FIG. 1 is a schematic view, which assumes a mechanism of absorbing and fixing $CO_2$ in the exhaust gas in the surface of the solid particles. As seen in FIG. 1, under the condition where adhesive water exists on the surface of the solid particles containing CaO, Ca ions are dissolved from the solid particles into the surface adhesive water, while $CO_2$ (carbon ions) is dissolved from the exhaust gas into the surface adhesive water, respectively. Both of Ca ions and carbon ions react in the surface adhesive water. Furthermore, $CaCO_3$ is precipitated mainly in the surface of the solid particles. When precipitating, the precipitating nucleus of $CaCO_3$ is not uniformly generated in water, nucleus of $CaCO_3$ is not uniformly generated in water, however, it is generated as a non-uniform nucleus which is easily generated in the surface of the solid particles. Therefore, the precipitation of $CaCO_3$ and growth thereafter occurs merely in the specific area on the surface of the solid particles. Consequently, it is considered that there can exist, at a considerable proportion, a surface area of the solid particles where neither precipitation nor growth of $CaCO_3$ takes place. Since it is possible to maintain the supply (dissolution) of Ca ions in the surface adhesive water of the solid particles, $CO_2$ can be effectively absorbed and fixed in a short period.

Further reference will be made to the preferable embodiment of the invention.

The present embodiment uses, as the $CO_2$ absorbing material, an agglomerate of solid particles containing CaO and/or $Ca(OH)_2$ as the composition. $Ca(OH)_2$ contained in the solid particles also reacts with $CO_2$ similarly to CaO. Since it can be fixed as $CaCO_3$, the solid particles may contain $Ca(OH)_2$. As mentioned above, CaO and $Ca(OH)_2$ contained in the solid particles are sufficient with such substances contained as a part of the composition of at least the solid particle, and therefore, substances other than CaO and $Ca(OH)_2$ as minerals are included which exist in the solid particles as parts of the composition such as $2CaO.SiO_2$, $3CaO.SiO_2$ or glass.

As such solid particles, in particular concrete containing much CaO (and/or $Ca(OH)_2$) or slag generated in the iron-steel making process are desirable. Reference will be made in detail later therefore.

Grain sizes of the solid particles are not especially limited, however the grain sizes which are as small as possible are preferable for securing to contact areas with the exhaust gas and increasing reactivity, specifically substantially 5 mm or lower (excepting solid particles of a large size inevitably included), in particular preferably 1 mm or less. Actually, it is preferable that grains of 5 mm or less occupy 90% or more.

As mentioned above, for securing the reactivity between the solid particles and $CO_2$ in the exhaust gas in the exemplified method, it is preferable that the main solid particles contacting the exhaust gas contain the appropriate amount of water. It is more desirable that the main solid particles contacting the exhaust gas have the surface adhesive water thereof. Surface adhesive water means the water content existing together with the solid particles and the water existing in the outer surface of the solid particles, except the water content contained within the grains. Preferably, the percentage of water content in the agglomerate of the solid particles is 3 to 20% from a similar viewpoint. Thus, for maintaining the water content of the solid particles and the agglomerate thereof, the water content is, as needed, previously added to the agglomerate of the solid particles.

The $CO_2$ containing exhaust gas to be contacted with the agglomerate of solid particles heightens reactivity with the solid particles by increasing the temperature thereof, to some extent. However, if the temperature of the exhaust gas to be introduced into the space (called as "reaction space" hereinafter) for contacting with the agglomerate of solid particles exceeds the boiling point of water supported in the reaction space, it evaporates the surface adhesive water of the solid particles, and hinders the reactivity. Therefore, it is preferable that the temperature of the exhaust gas is set to be at the boiling point of water or lower in the reaction space. Also for the same reason, preferably the temperature within the reaction space is kept at the boiling point of water or lower and, in addition, the temperature of the agglomerate of solid particles is also kept at the boiling point of water or lower within the reaction space.

From a similar viewpoint, it is preferable to have a higher concentration of steam in the exhaust gas, and so, it is desirable that $H_2O$ is saturated by an instrument by previously passing the exhaust gas in water, and subsequently the exhaust gas is contacted with the agglomerate of solid particles.

As the agglomerate of solid particles to be the $CO_2$ absorbing material, as far as being the agglomerate of solid particles containing CaO and/or $Ca(OH)_2$, no limit is provided, however in particular, in points that the containing rate of CaO (and/or $Ca(OH)_2$) is high and a recycle of materials is available, slag generated in the iron-steel making process, and concrete (for example, waste concrete) are desirable. Accordingly, preferably, at least one part of the solid particle comprising the agglomerate of solid particles is slag and/or concrete and, as is especially desirable, the main solid particles are slag and/or concrete.

As the agglomerate of solid particles to be the $CO_2$ absorbing material, other than slag and concrete, there may be listed mortar, glass, alumina cement, CaO containing refractory, or MgO containing with refractory, and one kind or more of the agglomerate of solid particles may be singly mixed, otherwise mixed with slag and/or concrete.

The agglomerate of solid particles has a better reactivity with $CO_2$ if the weight ratio (basicity) of CaO to $SiO_2$ is high, and from this viewpoint, it is preferable that $CaO/SiO_2$ is 1.2 or higher and, desirably, 1.5 or higher.

In general, the composition of CaO in the slag generated in the iron-steel making process is about 13 to 55 wt. %, and the composition of CaO in the concrete (e.g. waste concrete) is about 5 to 15 wt. % (the CaO composition in the cement: 50 to 60 wt. %), and being easily available, they are well-suited materials as the solid particles to be the $CO_2$ absorbing material.

As slag generated in the iron-steel making process, there may be enumerated slags from blast furnaces such as a slow cooling slag or a water granulated slag therefrom, which means slags from the iron-steel making process such as dephosphorized slag, desulfurized slag, desiliconized slag, decarburized slag or casting slag generated in pre-treatments, converter or casting slags from iron ore reduction; or slags from electric furnaces. However, there is no limit to the types of slags. Slag mixtures of two kinds or more may be used.

Slag generated in the iron-steel making process contains a considerable amount of iron (grain iron). If the agglomerate of solid particles of such slag is used as it is, since the CaO composition in the agglomerate of solid particles is lowered by the amount of the iron content, it is preferable to use slag having passed through a metal (iron) recovery treatment. The metal (iron) recovery treatment is generally carried out for recycling the iron content in slag to the iron-steel making process, and ordinarily slag is crushed for recovering the metal therein, and a considerable amount of the iron content is recovered and removed from slag by means such as a magnetic separation.

As a concrete, for example, waste concrete may be used which are made by destroying buildings or from civil engineering projects.

These materials are crushed into grain like or grain as needed and used as the agglomerate of solid particles.

As mentioned above, in the agglomerate of solid particles to be the $CO_2$ absorbing material, it is preferable that the basicity be high, for example, ane agglomerate of solid particles where the basicity is less than 1.5 as the water granulated slag, has a poor solubility of Ca ion, and is low in the reactivity with $CO_2$, and therefore it may not be said that the function as the $CO_2$ absorbing material is fully exhibited. This is why solid particles having a low basicity have a small amount of calcium silicate to be carbonized (e.g., $2CaO.SiO_2$ or $3CaO.SiO_2$), or have much glass as the water granulated slag.

Therefore, when utilizing, as the $CO_2$ absorbing material, an agglomerate of solid particles having a low basicity (ordinarily the basicity is less than 1.5), it is preferable to mix them with solid particles having a high basicity to be an alkaline stimulating agent for heightening the solubility of Ca ions from the solid particles having a low basicity, preferably an agglomerate of solid particles having a basicity being 1.8 or higher, adding water thereto (preferably after an air wetting cure (hydration cure)), and employing the thus obtained mixture as the $CO_2$ absorbing material. The solid particles having a high basicity of 1.8 or higher, act as an alkaline stimulating agent to the solid particles of having a low basicity under the existence of the water content, and accelerate the hydration of solid particles having a low basicity.

For example, in the case of a solid particle having lower contents of calcium silicate and CaO, the hydration of calcium silicate and CaO within the solid particle is accelerated by the alkaline stimulating agent, and as a result, Ca ions are ready to be dissolved from the solid particle and, even if a solid particle is per se less in calcium silicate and CaO, the dissolution of Ca ions is heightened as a whole. In addition, in the case of a solid particle having much glass, a silicate network forming the glass by ane alkaline stimulating agent is broken, and simultaneously the hydration thereof is accelerated, resulting in increasing the CaO content enabling carbonation.

Further, it is useful for heightening the $CO_2$ absorbing efficiency to prepare a condition of easily carbonating CaO by advancing the hydration effected by an air wetting cure (hydration cure) after the water addition. Namely, since a certain period of time is needed for the dissolution of alkali, by only mixing only solid particles of a low basicity and solid particles of a high basicity and by simply adding water, it is insufficient to effectively heighten the solubility of Ca ions of the solid particles having a low basicity. Therefore, desirably, after mixing the agglomerates of both solid particles, an air wetting cure is performed for a requisite period of time.

Such an air wetting cure brings about, as mentioned later, introduction of cracks into the solid particles or a refining effect of the solid particles, and also as a result, the $CO_2$ absorbing ability of the solid particles is increased.

The air wetting cure may be carried out by a simple method of, for example, mixing an agglomerate of solid particles having a high basicity and an agglomerate of solid particles having a low basicity, kneading the mixture under the existence of an appropriate amount of water content, and covering the mixture with a vinyl sheet. However, for preventing carbonation of the solid particles during curing, it is preferably carried out under an atmosphere substantially not containing $CO_2$, otherwise under an atmosphere substantially not supplied with $CO_2$ during at least curing, and accordingly, for example, in a space (atmosphere) cutting off the atmosphere. $CO_2$ contained in the atmospheric air exists at first in such a space, however more $CO_2$ is not supplied.

The time period for the air wetting cure is not especially limited, however, for obtaining desirable effects by the air wetting cure, practicing an air wetting cure for more than 12 hours, desirably 24 hours is preferable.

After practicing the air wetting cure, the mixture may be pulverized for use as the $CO_2$ absorbing material. By the pulverizing treatment, the contacting area with the exhaust gas containing $CO_2$ is increased, and the reactivity with $CO_2$ is heightened.

Further reference will be made to an effective method for heightening the $CO_2$ absorbing ability of the solid particles.

The solid particles (for example, waste concrete or slag generated in the iron-steel making process) to be used as the $CO_2$ absorbing material is generally massive or grain, and since it takes a long time for reacting with $CO_2$ until an interior of the solid particles, a CaO source at the interior of the solid particle trends to be less usefully used for absorption of $CO_2$. For solving this problem, it is useful to subject the massive or grain solid particles to the air wetting cure (hydration cure) so as to effect hydration expansion and, by this hydration expansion, cracks are introduced into the solid particle. Otherwise, breakage occurs from this crack into fine grains and, as the surface area of the solid particle to be contacted with $CO_2$ is increased, the absorbing effect of $CO_2$ by the CaO source is effectively improved. Further, it is possible to change a CaO containing substance in the solid particles to be a hydrated substance being ready for a carbonating reaction by the air wetting cure and also, as a result, the absorbing effect of $CO_2$ by the CaO source is increased.

When the agglomerate of solid particles is hydration-expanded by the air wetting cure, preferably the agglomerate of solid particles is laid in an atmosphere substantially not containing $CO_2$, otherwise in an atmosphere substantially not supplied with $CO_2$ during at least curing, and the air wetting cure is performed under the existence of the water. For supplying a water content to the agglomerate of solid particles, there is a method of adding water or warm water to the agglomerate of solid particles before and/or after laying the agglomerate of solid particles in the space for the air wetting cure, or a method of blowing steam to the agglomerate of solid particles laid in the space for the air wetting cure.

The reason why the air wetting cure is carried out in an atmosphere substantially not containing $CO_2$, otherwise in an atmosphere substantially not supplied with $CO_2$ during at least curing, is because the solid particles do not cause the carbonating reaction, preferably, for example, in a space (atmosphere) cutting off the atmosphere. $CO_2$ contained in the atmospheric air exists at first in such a space, however more $CO_2$ is not supplied.

When adding warm water to the agglomerate of solid particles, 60° C. or higher is desirable from the viewpoint of effective curing.

The agglomerate of solid particles having passed the air wetting cure may serve as the $CO_2$ absorbing material.

There is no special restriction in the actual means for contacting the exhaust gas with the agglomerate of solid particles, however the following may be exemplified as suitable treating systems in aspects of treating efficiency or ease of handling the agglomerate of solid particles.

(1) A system of contacting the exhaust gas with an agglomerate of solid particles in a fluidized bed using the exhaust gas as a fluidizing gas.

(2) Another system of contacting the exhaust gas with an agglomerate of solid particles in a rotary kiln.

(3) A further system of forming a layer filled up with an agglomerate of solid particles, supplying the exhaust gas in the packed bed, thereby to contact the exhaust gas and the agglomerate of solid particles.

Figure 2:
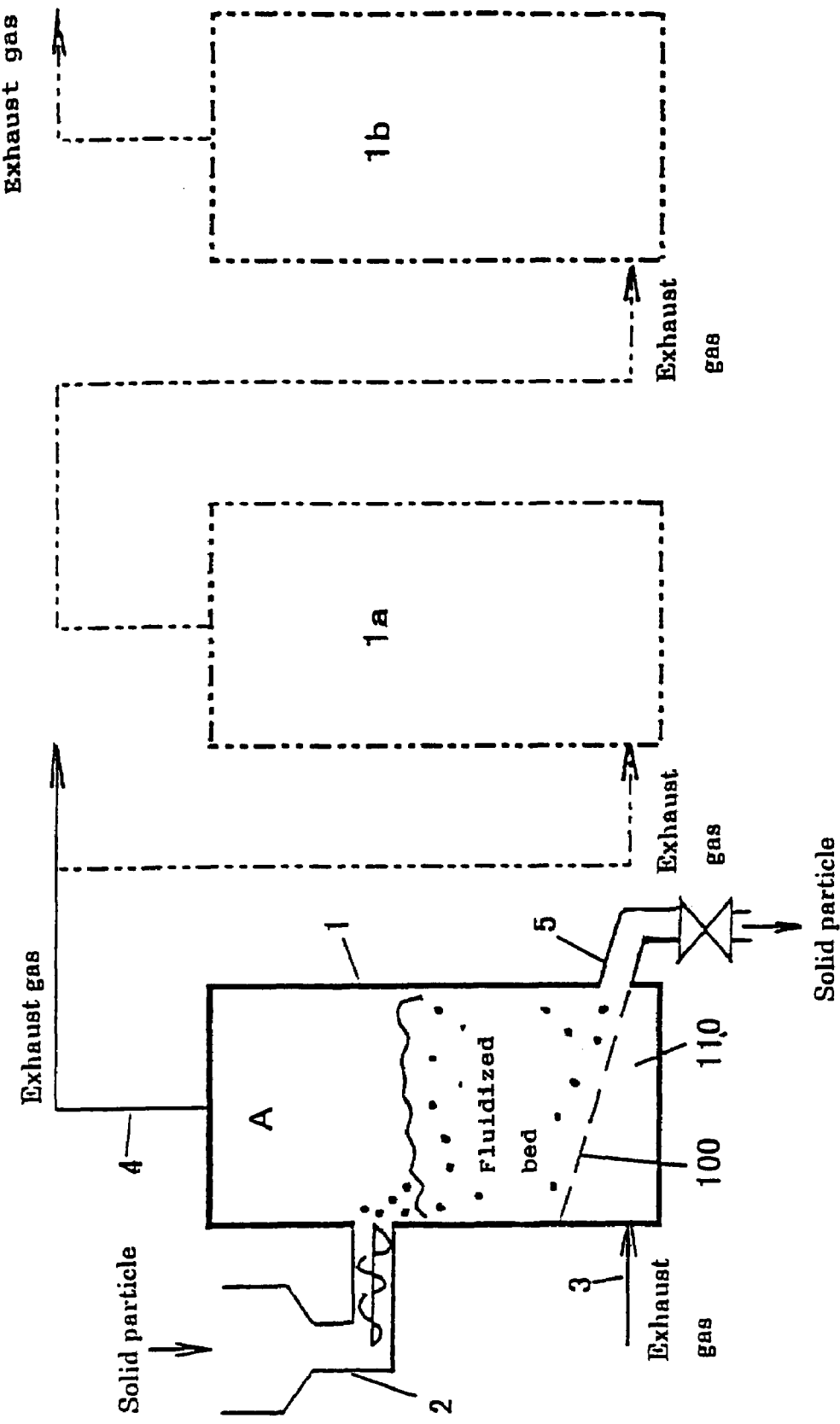
FIG. 2 is a schematic drawing showing one embodiment of the inventive method using a fluidized bed of the agglomerate of solid particles.

FIG. 2 shows one practiced embodiment of the above (1) system, wherein reference numeral 1 designates a processing container furnished with a gas dispersing plate 100 at a lower part and structured thereon with a space A for forming the fluidized bed, 2 is a device for supplying an agglomerate of solid particles in the processing container 1, 3 is a conduit for supplying the exhaust gas containing the $CO_2$ into the processing container 1 (a wind box 110 below the dispersing plate 100), 4 is a conduit for issuing the exhaust gas from the processing container 1, and 5 is a solid particle exhausting pipe for taking out an agglomerate of solid particles in the processing container 1 from time to time.

According to this treating system, the agglomerate of solid particles such as slag or concrete is supplied from the supply device 2 into the space A of the processing container 1, while the exhaust gas supplied from the gas supply conduit 3 into the wind box 110 is blown out into the space A from the gas dispersion plate 100, and the fluidized bed of the agglomerate of solid particle is formed. In the fluidized bed, the solid particles and $CO_2$ in the exhaust gas are reacted, and $CO_2$ is fixed as $CaCO_3$ to the solid particles. The exhaust gas having finished this reaction is discharged from the processing container 1 through the gas discharging conduit 4, and the solid particles within the processing container 1 is also discharged from the solid particle discharging pipe 5 in response to the degree ($CO_2$ absorbing ability) of absorbing $CO_2$.

A plurality of processing containers are installed as shown with two-dotted lines in FIG. 2 and, if the exhaust gas issuing conduits are connected in series to said plurality of chambers 1, 1a, 1b..., in other words, if the exhaust gas is successively treated through the plurality of processing containers installed in series in such a manner that the exhaust gas from the processing container 1 is supplied to the chamber 1a, and the exhaust gas from the chamber 1a is sent to the chamber 1b, it is possible to effectively curtail $CO_2$ in the exhaust gas.

The form of the fluidized bed for the treating system (1) is arbitrary and is not limited to that of FIG. 2.

Figure 3:
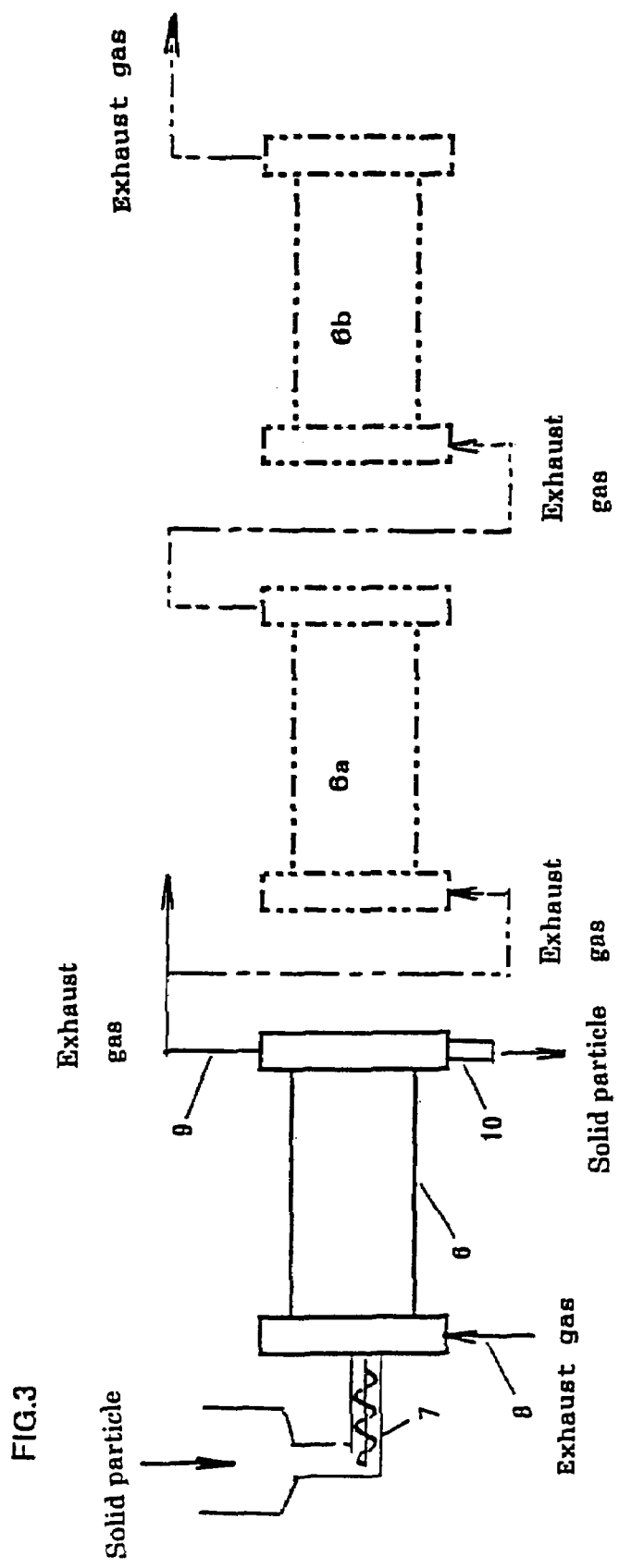
FIG. 3 is a schematic drawing showing one embodiment of the inventive method using a rotary kiln.

FIG. 3 shows one practiced embodiment of the above (2) system, wherein reference numeral 6 designates a rotary kiln, 7 is a device for supplying the agglomerate of solid particles into the rotary kiln 6, 8 is a gas supply conduit for supplying the exhaust gas containing $CO_2$ into the rotary kiln, 9 is a gas discharging conduit for issuing the exhaust gas from the rotary kiln 6, and 10 is a solid particle exhausting pipe for taking out the agglomerate of solid particles within the rotary kiln.

According to this treating system, the agglomerate of solid particles such as slag or concrete is supplied from the supply device 7 into a treating space of the rotary kiln 6, while the exhaust gas is supplied from the gas supply conduit 8, and the agglomerate of solid particles reacts with $CO_2$ in the exhaust gas as being mixed in the rotary kiln 6, and $CO_2$ is fixed as $CaCO_3$ to the solid particles. The exhaust gas having finished this reaction is discharged from the rotary kiln 6 through the gas discharging conduit 9, and the solid particles having reached an exit of the rotary kiln 6 are also discharged from the solid particle discharging pipe 10.

Also in this system, a plurality of rotary kilns are installed as shown with two-dotted lines in FIG. 3, and if the exhaust gas issuing conduits are connected in series to said plurality of rotary kilns 6, 6a, 6b, in other words, if the exhaust gas is successively treated through the plurality of rotary kilns installed in series in such a manner that the exhaust gas from the rotary kiln 6 is supplied to the rotary kiln 6a, and the exhaust gas from the rotary kiln 6a is sent to the rotary kiln 6b, it is possible to effectively curtail $CO_2$ in the exhaust gas.

The form of the rotary kiln for the treating system (2) is arbitrary, and is not limited to that of FIG. 3.

Figure 4:
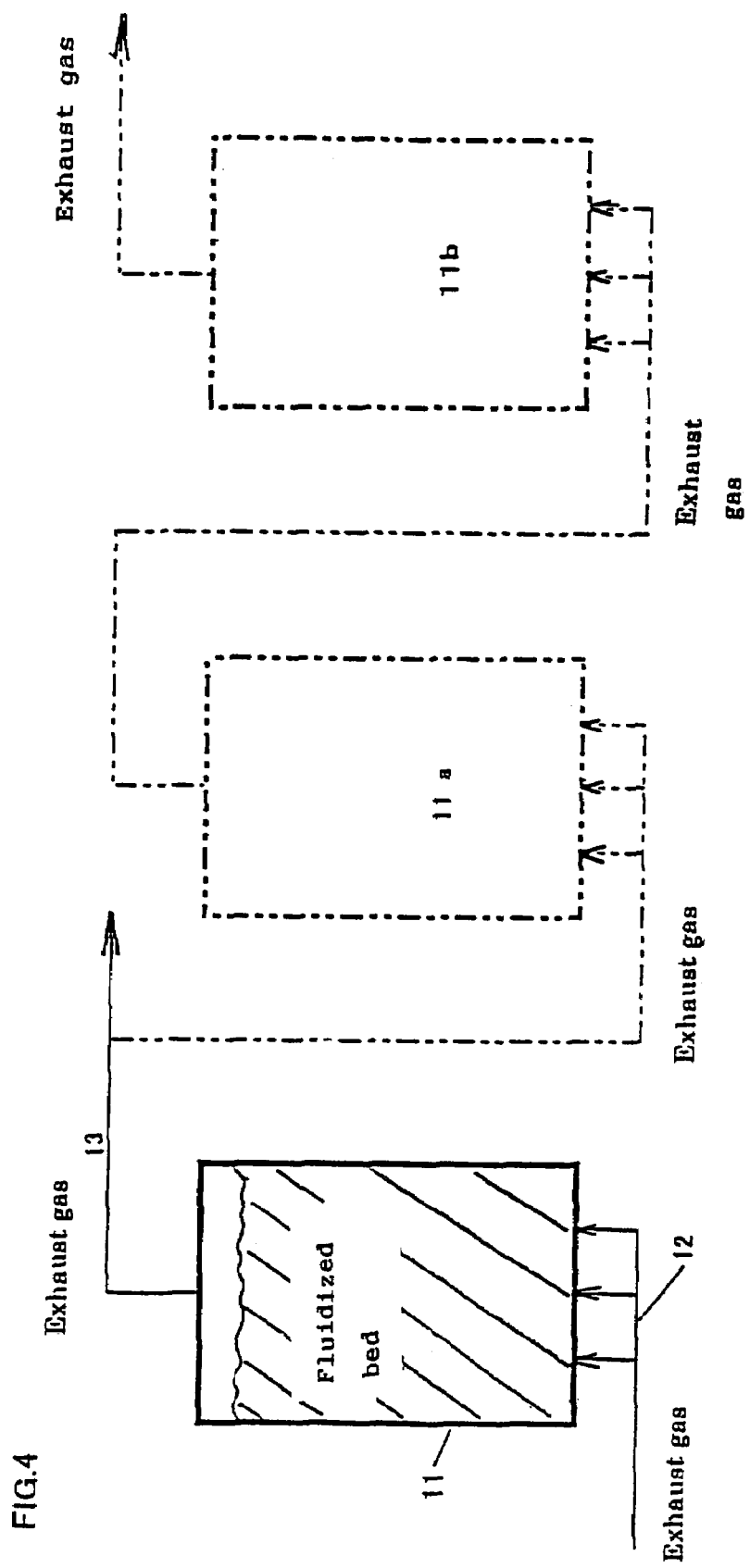
FIG. 4 is a schematic drawing showing one embodiment of the inventive method, wherein $CO_2$ containing gas is blown from one direction into the packed bed of the agglomerate of solid particles.

FIG. 4 shows one practiced embodiment of the above (3) system, wherein reference numeral 11 designates a closed or a half closed type container for forming a layer filled up by the agglomerate of solid particles, 12 is a gas supply conduit for blowing the exhaust gas containing $CO_2$ into the container 11, and 13 is a gas discharging conduit for issuing the exhaust gas from the container 11.

According to this treating system, the agglomerate of solid particles is charged into the container 11 to form a layer filled up thereby, to which the exhaust gas is supplied from the gas supply conduit 12, and while the exhaust gas flows through the packed bed, $CO_2$ in the exhaust gas reacts with the solid particles, and $CO_2$ is fixed as $CaCO_3$ to the solid particles. The exhaust gas having finished this reaction is discharged from the container 11 through the gas discharging conduit 13. In this system, since the agglomerate of solid particles in the container 11 is not fluidized as the fluidized bed, ordinarily solid particles are massively combined with one another by carbonating reaction. Therefore, after having processed for a certain period of time, the agglomerate of combined solid particles is taken out from the container 11, and subsequently the agglomerate of new solid particles is charged into the container 11.

Also in this system, a plurality of containers are installed as shown with two-dotted lines in FIG. 4, and if the exhaust gas issuing conduits are connected in series to said plurality of containers 11, 11a, 11b . . . , in other words, if the exhaust gas is successively treated through the plurality of containers installed in series in such a manner that the exhaust gas from the container 11 is supplied to the container 11a, and the exhaust gas from the container 11a is sent to the container 11b, it is possible to effectively curtail $CO_2$ in the exhaust gas.

The form of the container for the treating system (3) is arbitrary, and is not limited to that of FIG. 4.

In this treating system (3), if the filling rate of the agglomerate of solid particles in the packed bed is small, the exhaust gas becomes less to contact with the solid particles to affect influences with respect to the treating efficiency, and it is preferable that the filling rate of the agglomerate of solid particles is 40 to 90 vol. %, desirably 50 to 75 vol. %.

The $CO_2$ composition in the exhaust gas contacting with the agglomerate of solid particles also governs the treating efficiency, and if it is too low, the treating efficiency is decreased. For efficiently removing $CO_2$ in the exhaust gas, the $CO_2$ concentration should be more than 5% (preferably 10% or higher). As the exhaust gases, there are listed exhaust gases from $CaCO_3$, a calcination furnace, a hot blast furnace, a boiler, a coke oven, a sintering furnace, a slab heating furnace or an annealing furnace.

In the characteristics of the method of this embodiment, there is no problem that the exhaust gas of relatively low $CO_2$ concentration is to be treated by the method of this embodiment.

For heightening the treating efficiency, it is preferable that the exhaust gas to be supplied into the treating space is pressurized. The gas pressure is not especially limited, however since the higher the partial pressure of $CO_2$, the higher the dissolving speed of $CO_2$ into the surface adhesive water of solid particles, if $CO_2$ is contacted with the agglomerate of solid particles under the condition that $CO_2$ is pressurized, the treating efficiency can be heightened in comparison with contacting at atmospheric pressure.

The exhaust gas containing $CO_2$ to be treated by the present embodiment includes gases containing $CO_2$ issued from various kinds of facilities or equipment, and these exhaust gases (exhaust gases containing $CO_2$) are of course not limited. The exhaust gas containing $CO_2$ to be treated by the present embodiment includes, for example, gas generated in the iron-steel making process and utilized as fuel gas, so-called secondary gas (for example, gases from a blast furnace, converter or coke oven), irrespective of which is a combustion exhaust gas or a gas usable as fuel. Various kinds of exhaust gases generated from an iron making firm generally include $CO_2$ of high concentration, and as mentioned above, since the amount of the final energy consumption by all the iron and steel firms accounts for about 11% of the whole of Japan, the method of this embodiment may be said to be very useful for the treatment of many kinds of exhaust gases particularly generated from the iron making firms (the iron-steel making process).

As the secondary gas caused in the iron-steel making process such as a blast furnace, converter or coke oven has a high caloric value, it is used as a fuel gas. On the other hand, $CO_2$ is relatively substantially included in these exhaust gases (secondary gases), and is exhausted into the atmospheric air by and by (after having been used as fuel), a caloric value as the fuel gas is lowered by an amount containing $CO_2$, the amount of using the fuel gas is correspondingly increased by the amount of lowering the caloric value, and as a result the amount of generating $CO_2$ is increased.

Accordingly, in the method of this embodiment, it is possible to make the fuel gas high in calories and cut the amount of generating $CO_2$ in total together while decreasing the amount of the fuel gas used.

Further reference will be made to the preferable embodiment of the invention.

[a1] The method of reducing exhaust carbon dioxide, wherein at least one part of said agglomerates of solid particles is a slag generated in an iron-steel making process, and/or concrete.

[a2] The method of reducing exhaust carbon dioxide, wherein the solid grain comprising the agglomerates of solid particles is a slag generated in iron-steel making processes, and/or concrete.

[b] The method of reducing exhaust carbon dioxide, wherein the agglomerates of solid particles comprise at least one selected from the group consisting of concrete, mortar, glass, alumina cement, CaO containing refractories, and a slag generated in the iron-steel making process.

Other embodiments may be enumerated as follows.

[c] The method of reducing exhaust carbon dioxide as set forth in any of the above [1] to [14] (the method of [1] to [14] described in the "Summary of the Invention"), characterized in that the slag is a slag which has passed a metal recovering treatment.

[d] The method of reducing exhaust carbon dioxide as set forth in any of the above [1] to [14] and [a1] to [c], characterized in that weight ratio of $CaO/SiO_2$ of the agglomerates of solid particles to be contacted with the exhaust gas containing $CO_2$ is 1.2 or higher.

[e] The method of reducing exhaust carbon dioxide as set forth in any of the above [1] to [14] and [a1] to [d], characterized in that the exhaust gas containing $CO_2$ and the agglomerates of solid particles are contacted within a fluidized bed, wherein the exhaust gas serves as a gas for fluidizing.

[f] The method of reducing exhaust carbon dioxide as set forth in any of the above [1] to [14] and [a1] to [d], characterized in that the exhaust gas and the agglomerates of solid particles are contacted within a rotary kiln.

[g] The method of reducing exhaust carbon dioxide as set forth in any of the above [1] to [14] and [a1] to [d], characterized by forming a packed bed which is filled with the agglomerates of solid particles, and supplying the exhaust gas into said packed bed, thereby to contact the exhaust gas with the agglomerates of solid particles.

[h] The method of reducing exhaust carbon dioxide as set forth in the above [g], characterized by blowing the exhaust gas into said packed bed, thereby to contact the exhaust gas with the agglomerates of solid particles.

[i] The method of reducing exhaust carbon dioxide as set forth in the above [h], characterized by blowing said exhaust gas into the agglomerates of solid particles from one direction, thereby to contact the exhaust gas with the agglomerates of solid particles.

[j] The method of reducing exhaust carbon dioxide as set forth in the above [g], characterized in that the packing ratio of the agglomerates of solid particles in the packed layer is 40 to 90 vol. %.

[k] The method of reducing exhaust carbon dioxide as set forth in any of the above [1] to [14] and [a1] to [j], characterized in that the concentration of $CO_2$ in the exhaust gas to be contacted with the agglomerates of solid particles is 5% or more.

[l] The method of reducing exhaust carbon dioxide as set forth in any of the above [1] to [14] and [a1] to [k], characterized in that the agglomerates of solid particles where the weight ratio of CaO to $SiO_2$ is less than 1.5 and the agglomerates of solid particles where the weight ratio of CaO to $SiO_2$ is 1.8 or more, are mixed, and contacted with the exhaust gas containing $CO_2$ under a condition where the mixture is added with the water content.

[m] The method of reducing exhaust carbon dioxide as set forth in the above [l], characterized in that the agglomerates of solid grain of the weight ratio of CaO to $SiO_2$ being less than 1.5 are a water granulated slag from a blast furnace.

[n] The method of reducing exhaust carbon dioxide as set forth in the above [l] or [m], characterized in that the agglomerates of solid particles where the weight ratio of CaO to $SiO_2$ is less than 1.5 and the agglomerates of solid particles where the weight ratio of CaO to $SiO_2$ is 1.8 or more, are mixed, and performed with an air wetting curing.

[o] The method of reducing exhaust carbon dioxide as set forth in the above [n], characterized by operating a hydration curing for 12 hours or more.

[p] The method of reducing exhaust carbon dioxide as set forth in the above [n] or [o], characterized in that the agglomerates of solid particles are performed with the air wetting curing, and then crushed.

[q] The method of reducing exhaust carbon dioxide as set forth in any of the above [1] to [14] and [a1] to [q], characterized in that the agglomerates of solid particles are performed with the air wetting curing so that the solid particles are hydration-expanded, thereby to be finely crushed by cracking and/or breaking, and the agglomerates of solid particles after the air wetting curing is contacted with the exhaust gas containing $CO_2$.

[r] The method of reducing exhaust carbon dioxide as set forth in the above [q], characterized by performing the air wetting curing in an atmosphere substantially not containing $CO_2$ or an atmosphere being substantially not supplied with $CO_2$ during at least curing.

[s] The method of reducing exhaust as set forth in the above [q] or [r], characterized by adding water or warm water to the agglomerates of solid particles to be performed with the air wetting curing.

[t] The method of reducing exhaust carbon dioxide as set forth in the above [s], characterized in that the temperature of the warm water to be added to the agglomerates of solid particles is 60° C. or higher.

[u] The method of reducing exhaust carbon dioxide as set forth in the above [q] or [s], characterized by blowing steam into the agglomerates of solid particles to be performed with air wetting curing.

[v] The method of reducing exhaust carbon dioxide as set forth in any of the above [1] to [14] and [a1] to [u], characterized in that the exhaust gas containing $CO_2$ is an exhaust gas generated in the iron-steel making process.

[w] The method of reducing exhaust carbon dioxide as set forth in any of the above [1] to [14] and [a1] to [u], characterized in that the exhaust gas containing $CO_2$ is an exhaust gas to be used as fuel gas.

[x] The method of reducing exhaust carbon dioxide as set forth in the above [w], characterized in that the exhaust gas to be used as the fuel gas is a secondary gas (for example, one or two kinds of gases from the blast furnace, converter and coke oven) generated in the iron-steel process.

Further reference will be made to Examples relating to the above-mentioned embodiments.

EXAMPLE 1

A pipe shaped reactor of 2 m length having an inlet and an outlet for the exhaust gas at both ends was filled with the slag (grain size: 10 mm or lower, CaO: 35 wt. %, water content: 6%, packing ratio: 50 vol. %). The packed bed was supplied with the exhaust gas ($CO_2$ concentration: 20%, temperature: 40° C.) at the gas pressure: 0.3 kgf/cm$^2$-G for 24 hours, and as a result of measuring the $CO_2$ absorbing amount by the slag, the absorbed $CO_2$ was about 0.2 at value of $CO_2$/slag.

Being based on this $CO_2$ absorbing amount, when the $CO_2$ absorbing amount in a real machine was calculated by trial, the calculation meant that it was possible to absorb $CO_2$ of 15,000 t/year (in terms of C), using 200,000 t/year of slag.

EXAMPLE 2

Prepared were the as slowly cooled dephosphorized slag of 48 wt. % CaO, and the slag where said dephosphorized slag was charged in a steel-made container, blown with steam under the condition of cutting off the air, and performed with an air wetting cure (hydration cure).

The cured slag and the non-cured slag were passed through a 20 mm screen to produce grain like slags of −20 mm size. These slags were investigated with respect to the ratio of grain like slags of −5 mm, using a 5 mm screen.

The above cured slag and the non-cured slag of −20 mm grain size were respectively adjusted to be the 6% water content, and charged 2 kg into the molds (Ø100 mm×200 mm), and blown with carbon dioxide ($CO_2$ concentration: 20%, temperature: 25° C.) 2 liter/min for 24 hours from the mold bottoms, and the slags were recovered to measure the $CO_2$ absorbing (fixing) amount.

The results are shown in Table 1. According to the results, in Examples 2-1, cracks were introduced in the slag grain by the hydration expansion owing to the air wetting cure, and in comparison with the non-cured slag, the ratio of fine slag of −5 mm or smaller increased by 10 wt. %, and as seen from this, cracks occurred in the slag grains by hydration expansion, so that, when using the cured slag, the $CO_2$ absorbing efficiency was more heightened than Example 2-2, and more $CO_2$ could be absorbed.

TABLE 1

| Treating conditions | Examples 2-1 | Examples |
|---|---|---|
| Hydration curing time (hr) | 24 | 0 |
| Carbon dioxide passing time | 24 | 24 |
| Slag amount (wt. %) of −5 mm before supplying carbon dioxide | 50 | 40 |
| $CO_2$ absorbing (fixing) amount (wt. %) | 14 | 6 |

In relation with the above mentioned first embodiment, a second embodiment is concerned with a sea-water immersion block, a method of making the same, a river water immersion block, a method of making the same, and a method for providing algae planting places. Reference will be made thereto.

Immersion Block in Sea-Water

The inventors made experiments and investigations, and as a result, they found the following facts.

(1) Grain like slags, rough grain like slags or small massive slags, in particular such slags moderately containing an iron content are consolidated with a binder of $CaCO_3$ or $CaCO_3$ and $MgCO_3$ produced by a carbonating reaction, and the thus consolidated massive slag is used as sea water-immersion blocks, thereby displaying excellent effects in the rearing of marine algae without increasing the pH of the sea water.

(2) On the other hand, for a sea area which necessitates to control for a shortage of oxygen in the sea water owing to the oxidation of iron content or an excessive supply of iron content into the sea water, the grain-like or the rough grain like slags having passed the metal removing treatment are consolidated with a binder of $CaCO_3$ or $CaCO_3$ and $MgCO_3$ produced by a carbonating reaction. The thus consolidated massive slag is used as sea water-immersion blocks, thereby displaying excellent effects in the rearing of marine algae without causing a shortage of oxygen in the sea water owing to oxidation of iron content or an excessive supply of iron content into the sea water or increasing the pH of the sea water.

(3) For obtaining the massive immersion block in the sea water as mentioned above, such a production method is useful which consolidates the above mentioned slags by piling or packing at a desired composition of at least one slag selected from the group of the grain like slag, the rough grain like slag and the small massive slag, otherwise the grain like or rough grain like slag having passed the metal removing treatment, and by causing a carbonating reaction in the piled or packed bed under the existence of carbon dioxide. According to this production method, it is possible to produce blocks of arbitrary density and size in response to conditions of sea bottoms or ocean currents to be applied with blocks.

The present embodiment has been practiced based on the above mentioned findings, and is characterized as follows.

(1) The embodiment is concerned with immersion blocks in the sea of a main raw material being a slag generated in the iron-steel making process, consolidating the slag with a binder of $CaCO_3$ produced by carbonating reaction, and making the slag massive. This slag is at least one selected from the group of the grain like slag, the rough grain like slag and the small massive slag. The present slag is sufficient with grain like or rough grain like slag having passed a metal removing treatment.

(2) The embodiment is concerned with immersion blocks in the sea of a main raw material being a slag generated in the iron-steel making process, consolidating the slag with a binder of $CaCO_3$ and $MgCO_3$ produced by a carbonating reaction, and making the slag massive. The embodiment includes a case where $MgCO_3$ exists as a hydrate, hydroxide salt or double salt. This slag is at least one selected from the group of the grain like slag, the rough grain like slag and the small massive slag. The present slag is sufficient with grain like or rough grain like slag having passed a metal removing treatment.

(3) The embodiment is concerned with immersion blocks in the sea of main raw materials being a slag generated in the iron-steel making process, grain like additives and/or rough grain like additives, consolidating a mixture of the slag and the additives with a binder of $CaCO_3$ produced by a carbonating reaction, and making the slag massive. This slag is at least one selected from the group of the grain like slag, the rough grain like slag and the small massive slag. The present slag is sufficient with grain like or rough grain like slag having passed a metal removing treatment.

(4) The embodiment is concerned with immersion blocks in the sea of main raw materials being a slag generated in the iron-steel making process, grain like additives and/or rough grain like additives, consolidating a mixture of the slag and the additives with a binder of $CaCO_3$ and $MgCO_3$ produced by a carbonating reaction, and making the slag massive. The embodiment includes a case where $MgCO_3$ exists as a hydrate, hydroxide salt or double salt. This slag is at least one selected from the group of the grain like slag, the rough grain like slag and the small massive slag. The present slag is sufficient with grain like or rough grain like slag having passed the metal removing treatment.

(5) A method of making immersion blocks in the sea water is characterized in that the slag generated in the iron-steel making process is, as needed, mixed with one kind or more selected from CaO, $Ca(OH)_2$, MgO and $Mg(OH)_2$, and the slag is piled, or the packed bed is formed in an arbitrary space, and is subjected to a carbonating reaction under the existence of carbon dioxide so as to consolidate the slag for providing blocks of the massive slag. This slag is at least one selected from the group of the grain like slag, the rough grain like slag and the small massive slag. The present slag is sufficient with grain like or rough grain like slag having passed a metal removing treatment.

(6) A method of making immersion blocks in the sea water is characterized in that the slag generated in the iron-steel making process is mixed with grain like additives and/or rough grain additives and is, as needed, mixed with one kind or more selected from CaO, $Ca(OH)_2$, MgO and $Mg(OH)_2$, and the slag is piled or the packed bed is formed in an arbitrary space, and is subjected to a carbonating reaction under the existence of carbon dioxide so as to consolidate the slag for providing blocks of the massive slag. This slag is at least one selected from the group of the grain like slag, the rough grain like slag and the small massive slag. The present slag is sufficient with grain like or rough grain like slag having passed the metal removing treatment.

(7) In the embodiments (1) to (6), one part or all of the slag generated in the iron-steel making process may be replaced with a CaO containing material (for example, waste concrete).

The present embodiment is concerned with the immersion blocks in the seawater of a main raw material being a slag generated in the iron-steel making process. As the slag generated in the iron-steel making process, there may be enumerated slags from blast furnaces such as a slowly cooled slag or a water granulated slag therefrom. That is to say, slags from the iron-steel making process such as dephosphorized slag, desulfurized slag, desiliconized slag, decarburized slag or casting slag generated in pre-treatments, converter or casting; slags from iron ore reduction; or slags from electric furnaces. However, no limit is provided to them. Slag mixtures containing two kinds or more of slag may be used.

Of these slags, the compositions of representative ones will be exemplified as follows.

(1) Decarburized slag . . . T.Fe: 17.5%, CaO: 46.2%, $SiO_2$: 11.7%, $Al_2O_3$: 1.4%, MgO: 8.3%, MnO: 6.2%, P: 0.76%, S: 0.04%

(2) Dephosphorized slag . . . T.Fe: 5.8%, CaO: 54.9%, $SiO_2$: 18.4%, $Al_2O_3$: 2.8%, MgO: 2.3%, MnO: 1.9%, P: 2.8%, S: 0.03%

(3) Desulfurized slag . . . T.Fe: 10.5%, CaO: 50.3%, $SiO_2$: 10.0%, $Al_2O_3$: 5.4%, MgO: 1.1%, MnO: 0.4%, P: 0.13%, S: 1.8%

(4) Desiliconized slag . . . T.Fe: 10.5%, CaO: 13.6%, $SiO_2$: 43.7%, $Al_2O_3$: 3.8%, MgO: 0.4%, MnO: 15.8%, P: 0.10%, S: 0.19%

(5) Water granulated slag: T.Fe: 0.3%, CaO: 42.0%, $SiO_2$: 33.8%, MnO: 0.3%, MgO: 6.7%, $Al_2O_3$: 14.4%

Incidentally, among the slags generated in the iron-steel making process, the dephosphorized slag is high in P content and the desiliconized slag is high in MnO. Therefore, those are difficult to be used as raw materials for cement. However, the invention can make use of them as main raw materials of the sea water-immersion blocks with no accompanying problem involved therewith.

The slags generated in the iron-steel making process as mentioned above contain relatively much metal (iron content as grain iron) though more or less (ordinarily, around several wt % to 30 wt %), and metals in slags are pulverized to recover for recycling the iron content to the iron-steel making process. Accordingly, including the grain like, rough grain like or small massive slags, the slags having passed the metal recovering process are necessarily the grain like, rough grain like or small massive slags. Ordinarily, grain sizes of the slag having passed the metal recovering process are at cm-order or smaller (for example, 5 cm or smaller).

The present embodiment employs at least one of these grain like, rough grain like or massive slags for sea water-immersion blocks.

The slag to be employed in the embodiment is sufficient with at least one of the grain like, rough grain like or massive slags, and it is not a necessary condition to pass the metal recovery treatment.

Herein, by the metal recovery treatment is meant a treatment for yielding metals from slags aiming at recycling metals contained in slags, and this is different from a treatment for substantially removing metals in slags as the metal removing treatment. Therefore, the slag in the metal recovery treatment is not pulverized finely as in the metal removing treatment, and so the treated slag still contains much metal. On the other hand, by the metal removing treatment is meant a treatment which finely pulverizes the slag in grain like or rough grain like and removes all metals except inevitably remaining ones.

When these slags are rendered to be raw materials of sea water-immersion blocks; the iron containing amount is not required to be low as in the case where the slag having passed the later mentioned metal removing treatment is rendered to be a raw material of block. Rather, it is better that the iron content of a proper amount (particularly, metallic iron or alloyed iron material such as grain iron) is contained in slag. This is why the iron content contained in the slag in a proper amount is dissolved in the sea water, so that the iron content is supplied as a nutrient salt in the sea water, and this usefully works for rearing marine algae. Thus, the iron content in slag is appropriately 3-wt % or more.

The iron content in slag is adjusted by the following two methods.

(a) The metal (such as grain iron) contained per se in slag is utilized as it is, not recovering parts or all but leaving it to remain.

(b) All of the substantial parts of the metal in slag (excepting the metal, which cannot inevitably be removed) are removed through the metal removing treatment and are added with metallic iron or metal containing iron materials as additives.

Depending on the method (b), the following merits are brought about.

(1) In the method (a) which leaves the metal (such as grain iron) contained per se in slag is utilized as it is, not recovering one part, it is difficult to correctly adjust the amount of the metal remaining in slag. Namely, the metal recovery from slag is carried out by a magnetic separation and owing to the nature of the magnetic separation, it is very difficult to recover the metal, leaving the metal of a certain amount in slag. If possible, a troublesome control or operation is required for carrying out the magnetic separation. On the other hand, in the method (b), since all of the substantial parts of the metal per se contained in slag are removed and anew added with the metallic iron or the metal containing iron materials as additives, the iron content in slag can be arbitrarily controlled.

(2) For the same reason as above, the method (a) which leaves the metal (such as grain iron) contained per se in slag, not recovering parts, cannot select shapes or sizes of the metal in slag. As later mentioned, what is preferable in general is so-called grain iron as the iron content contained in the slag which comprises the sea water-immersion blocks.

(3) However, for partially recovering the metal by the magnetic separation, such grain iron does not always remain, but rather it is recovered and removed, and large sized metal is probably left. On the other hand, the method (b) can arbitrarily select shapes and sizes of metallic iron to be added to the slag, and a desirable iron source such as grain iron can be contained in the slag.

Therefore, for obtaining slags containing metallic iron or metal containing iron materials, it is most preferable to once remove all substantial parts in slag (except inevitably removable metals) by a metal removing treatment, and to add the metallic iron or metal containing iron materials as new additives.

In general, as later mentioned, the metal removing treatment is carried out by the magnetic separation after pulverizing slags into grain or rough grain. Including slags of grain like or rough grain like states per se, the slag having passed the metal removing treatment becomes inevitably grain or rough grain. Ordinarily, the slag passing the metal removing treatment a has grain size of mm-order or smaller.

In the above metal removing treatment, metals in slags are desirably removed as much as possible, except inevitably removable metals. Normally, the iron content (metal) in slag after the metal removing treatment is preferably less than 3 wt %. With respect to the slag having passed the metal removing treatment, such slags are obtained which have the iron content of a desired amount containing the metallic iron such as grain iron and/or the metal containing iron material.

As the metallic iron or the metal containing iron material to be added into slag, the following is taken into consideration. One of them is that, when molding the slag, the metallic iron or the metal containing iron material of large shapes do not hinder the molding. The other is to enlarge specific surface areas of such as the metallic iron contained in slag for heightening dissolution of the iron content from blocks immersed in the sea water. From the above viewpoint, preferable are those of small grain size and uniform scale, and from this, the grain iron is most desirable. As the grain iron, not only grain iron recovered from slag but also other grain iron arbitrarily available may be used.

Depending on circumstances of sea water areas of the immersion block, there is a possibility of encountering problems of a shortage of oxygen in the sea water owing to an oxidation of the iron content in the slag or an excessive supply of iron content in the sea water. In order to solve the above-mentioned problems, the slag to be used is subjected to a metal removing treatment and is used as raw material of a block material without adding metal iron or metal including iron material.

The slags generated in the iron-steel making process as mentioned above contain relatively much metal, though more or less, and the metals in slags are recovered at considerable degree by the metal recovering treatment. However since the slag content and the metal are mixed (entangled), the metal cannot be completely removed by a pulverizing treatment of such degree as an ordinary metal recovering process, and so a considerable amount of metal remains in the slag after the metal recovering process. Therefore, for sinking of a sea water block obtained from slag having passed only a metal recovery, problems will arise with respect to a shortage of oxygen in the sea water owing to the oxidation of iron content in slag or excessive supply of iron content into the sea water. Thus, for blocks to be applied to such sea areas, the slags to be raw material are those which have removed main metal by passing a metal removing treatment.

As mentioned above, since the slag content and the metal are mixed in slag (entangled), it is necessary to remove the metal by magnetic separation under conditions of using pulverized slags into grain like or rough grain like. Including slags of grain or rough grain states per se, the slag having passed the metal removing treatment becomes inevitably grain or rough grain. Ordinarily, the slag passing the metal removing treatment has a grain size of mm-order or smaller (for example, 5 mm or lower).

Therefore, for the sea water-immersion blocks of the invention to be applied in the sea area involved with the problems concerning the shortage of oxygen in the sea water owing to oxidation of the iron content in slag or the excessive supply of iron content in the sea water, the raw material is the slag shaped in grain and/or rough grain having passed the metal recovering treatment.

In the metal removing treatment, metals in slags are desirably removed as much as possible, except inevitably removable metals. Normally, the iron content (metal) in slag is preferably less than 3 wt %.

In the present embodiment, it is found that a main raw material is at least one slag selected from a group of grain like slag, rough grain like slag and small massive slag. Otherwise, the main material is a slag of grain like and/or rough grain like slag, which has passed the metal removing treatment. This is consolidated (carbonation solidification) as the binder of $CaCO_3$ or $CaCO_3$ and $MgCO_3$, and the massive blocks are well-suited materials as blocks for algae planting places, building rocky beaches or fish gathering rocky places. At least the above mentioned slag includes such slags added with metallic iron and/or metal containing iron material.

It is an old technique to consolidate grains by reacting CaO and $CO_2$, that is, utilizing $CaCO_3$ produced by a carbonation reaction. If the grain containing CaO is laid under an atmosphere of carbon dioxide, $CaCO_3$ is produced by the following formula, and a consolidating phenomenon occurs as a binder of $CaCO_3$ among grains.

$$CaO+CO_2 \rightarrow CaCO_3$$

Previously, as techniques making use of the carbonation reaction, there are proposals of a method of making a raw material with a mixture of water and air-granulated slag in a steel-making process for making solidified products for buildings (e.g., Japanese Laid-Open Patent 58-74559), or a method of making non-calcined pellets (e.g., Japanese Laid-Open Patents 57-92143, 58-48642, and 58-133334). However these prior art publications aim only at making hardened products or non-calcined pellets having desired strength in a short period of time. These publications make no reference to block materials obtained by consolidating, through a carbonation reaction, grain like, rough grain like or small massive slags, otherwise the grain or rough grain like slags passing a metal recovering treatment, and that the thus obtained blocks are very useful materials as sea water-immersion blocks for algae planting places owing to properties thereof.

With respect to the grain containing MgO, if it is laid under an atmosphere of carbon dioxide, $MgCO_3$ is produced by the carbonation reaction and a consolidating reaction occurs as a binder of $MgCO_3$ among grains. $MgCO_3$ generated by a carbonation reaction of MgO is variously modified as an anhydrate, a hydrate (for example, a dihydrate, a trihydrate, a pentahydrate) hydroxide salt (basic magnesium carbonate), and a trihydrate of $MgCO_3$ is produced by the following formula.

$$MgO+CO_2+3H_2O \rightarrow MgCO_3 \cdot 3H_2O$$

In general, the slag generated in the iron-steel making process contains a considerable amount of CaO (ordinarily, 20 to 60 wt. %), and the block materials to be immersed in the sea according to the present invention are those produced by changing, into $CaCO_3$, at least one slag selected from the group of the grain like slag, the rough grain like slag and the small massive slag, otherwise CaO or $Ca(OH)_2$ modified from this CaO (including as needed CaO, $Ca(OH)_2$) contained in grain like slag and/or the rough grain like slag, and consolidating to make massive the slag grains (if containing the additives, grain or slag grain) with a binder of $CaCO_3$.

Major parts of slags contain MgO of a certain amount together with CaO, and the block materials to be immersed in the sea according to the present embodiment where such slag is the raw material, changes MgO or $Mg(OH)_2$ modified from this MgO (including as needed MgO, $Mg(OH)_2$) into $MgCO_3$ by the above mentioned carbonation reaction, and consolidating to make massive the slag grains (if containing the additives, grain or slag grain) with a binder of $MgCO_3$ and $CaCO_3$.

Incidentally, as mentioned above, $MgCO_3$ produced by the carbonation reaction of MgO is variously modified as an anhydrate, a hydrate or a hydroxide salt, and $MgCO_3$ contained as the binder in the sea water-immersion blocks of the invention is sufficient with any formed $MgCO_3$. For example, the hydrates of $MgCO_3$ are $MgCO_3.2H_2O$, $MgCO_3.3H_2O$ or $MgCO_3.5H_2O$, and hydroxide salt (basic magnesium carbonate) is $MgCO_3.Mg(OH)_2.3H_2O$, $4MgCO_3.Mg(OH)_2.4H_2O$, $4MgCO_3.Mg(OH)_2.5H_2O$, or $4MgCO_3.Mg(OH)_2.8H_2O$. Further, $MgCO_3$ combines with other salts to form various double salts, and $MgCO_3$ existing as these double salts is sufficient.

With respect to the slag generated in the iron-steel making process, parts or all of CaO or MgO contained therein are sometimes changed into $Ca(OH)_2$ or $Mg(OH)_2$ by water absorption as time passes or other causes, however this is no problem to the block to be utilized in the invention, and $Ca(OH)_2$ or $Mg(OH)_2$ are changed into $CaCO_3$ or $MgCO_3$ as the immersion blocks in the sea.

The immersion blocks in the sea have the following merits as blocks for algae planting places, building rocky beaches or fish gathering rocky places.

(1) Major parts of CaO (or $Ca(OH)_2$ produced from CaO) contained in the slag is changed into $CaCO_3$, and so the pH of the sea water is prevented from increasing by CaO. On the other hand, the iron content (in particular, metallic iron or metal containing iron material) of a proper amount is contained in slag, and this iron content is dissolved, thereby to supply an iron content as a nutrient salt which is useful for rearing marine algae in the sea water.

(2) At least one slag selected from the group of the grain like slag, the rough grain like slag and the small massive slag, otherwise the massive slag obtained by carbonation-solidifying the grain like slag and/or the rough grain like slag having passed the metal removing treatment, have porous properties as a whole (surface and interior), so that the marine algae easily attach to the surfaces of blocks. In addition, since the interior of the block is also porous, elements contained in blocks useful for growing and accelerating of the algae (for example, later mentioned soluble silica or iron content) are easily dissolved. Therefore, those can effectively accelerate growing of the marine algae compared to the case of using massive slags per se for building sea water-immersion blocks or fish gathering rocky places made of concrete where the slag is an agglomerate.

In particular, for effectively accelerating the increase and living of marine algae on immersion blocks at places of building algae planting places, the living of young algae should be accelerated on the block surfaces. In this regard, as the useful elements dissolving in the water from immersion blocks effectively work if individuals of the marine algae are near to blocks, they are very useful to the living of young algae.

(3) When using massive slags per se as immersion blocks, because of restraints of cooling methods or conditions of molten slags, dimensions of slag are limited (ordinarily, about 800 mm at maximum), and it is difficult to provide large massive blocks of regular sizes. On the other hand, at least one slag selected from the group of the grain like slag, the rough grain like slag and the small massive slag (otherwise the blocks obtained by carbonation solidifying the grain like slag and the rough grain like slag), can arbitrarily adjust the size by selecting shapes when carbonation-solidifying or selecting cut shapes after the carbonation solidification. It is possible to easily obtain large massive blocks particularly suited to algae planting places or fish gathering rocky places.

(4) It is preferable to use immersion blocks in the sea of optimum density (specific gravity) in response to conditions of sea bottom or currents. For example, when sinking blocks of large density to sea bottoms such as piling of sludge, the blocks are immersed into the sludge and cannot serve as algae places or fish gathering places. In this regard, at least one slag selected from the group of the grain like slag, the rough grain like slag and the small massive slag, otherwise the blocks obtained carbonation solidifying the grain like slag and/or the rough grain like slag having passed the metal removing treatment, can arbitrarily adjust the density by appropriately adjusting bulk density (compaction density).

(5) In the case of blocks for sinking in the sea obtained from the grain like slag and/or rough grain like slag having passed the metal removing treatment, since the main metal content is removed, if the blocks are applied in such sea areas having problems regarding the shortage of oxygen of the sea water or an excessive supply of the iron content, there occurs no problem of a shortage of oxygen in the sea water by oxidation of the metal or the excessive supply of the iron content by dissolution thereof. Further, the blocks for sinking in the sea obtained from slag having removed the metal have relatively many components attributing to the carbonation solidification of the slag by an amount of removing the metal, and those are useful for securing strength.

The blocks for sinking in the sea of the present embodiment are produced by closely consolidating slags of small diameter with binders of $CaCO_3$ or $CaCO_3$ and $MgCO_3$ produced by the carbonation reaction, and have enough strength. So, when transferring or sinking in the sea, those are not cracked or broken, even after having laid in the sea for a long period of a year.

For providing suited compositions in response to conditions of sea areas to be applied, it is possible to contain various kinds of additives (grain like slag, rough grain like slag or small massive additives) into the immersion blocks in the sea, together with at least one slag selected from the group of the grain like slag, the rough grain like slag and the small massive slag, otherwise the blocks obtained carbonation solidifying the grain like slag and the rough grain like slag having passed a metal removing treatment. As the additives, enumerated are such as grains or rough grains to be a soluble silica source (soluble silica or materials containing soluble silica), grain like or rough grain like to be an iron source (metallic iron, metal containing iron material, oxidized iron or oxidized iron containing materials), or CaO of grain like or rough grain like. For CaO contained as the additive in the immersion blocks in the sea, it is necessary to leave at least parts of CaO to be significantly added to CaO contained in the slag or the slag as non-reacted CaO after a carbonation solidification.

The soluble silica or the iron source (iron or oxidized iron) contained in the immersion blocks is dissolved in the sea, thereby to usefully work to sustain the living of marine algae. From the viewpoint of the dissolution in the seawater and the breeding of marine algae, the metallic iron or the metal containing iron material among the iron sources are particularly preferable. However, there are some cases wherein the seawater immersion blocks obtained from the grain like slag and/or rough grain like slag having passed a metal removing treatment are applied in such sea areas having problems concerning the shortage of oxygen in the sea water or excessive supply of the iron content. In this case, the metallic iron or the metals containing iron material are not added.

When phosphorus is a cause of a red tide or sulfur is a cause of a blue tide are substantially contained in the sea bottom, CaO contained a bit in the immersion blocks absorbs phosphorus or sulfur. In the case wherein CaO is substantially contained in the block material as mentioned above, there is a problem of increasing the pH of the seawater, however, for absorbing phosphorus or sulfur, it is sufficient to contain CaO in a small amount to an extent of remaining after the carbonation solidification.

As grains or rough grains to be the soluble silica source, included are the soluble silica and/or the material containing the soluble silica of the grain or rough grain. As a material containing the soluble silica, fly ash or clinker ash may be used which are generated by coal combustion such as in a thermal power station. The fly ash contains the soluble silica in an amount of 45 to 75 wt. %, while the clinker ash contains 50 to 65 wt. %.

The water granulated slag from a blast furnace also contains relatively much soluble silica, and if parts or all of the slag are rendered to be the water granulated slag, for example, if a slag by steel making and the water granulated slag are mixed, a similar effect is brought about to the case of adding the additive to be a soluble silica source.

As the grain or the rough grain to be the iron source, included are the grains or the rough grain as the grain iron, the metallic iron, or the metal containing iron material, the grain like or rough grain like oxidized iron and/or the oxidized iron containing material, and in particular, cheaply available grain or rough grain are iron containing dusts generated in the iron-steel making process. The iron containing dust is generally a dust from iron making, and ordinarily contains oxidized iron of about 75% in terms of Fe. Mill scales also contains oxidized iron of about 70% in terms of Fe.

As mentioned above, when sinking blocks of large specific gravity to the sea bottom such as piling of sludge, the blocks are immersed into the sludge and cannot serve as algae places or fish gathering places. Therefore, with respect to the block material to be used to the sea bottom of piled sludge, it is preferable that a slag of relatively small specific gravity is a main raw material, and specifically, it is useful to use the water granulated slag of the small specific gravity rather than that of other slag as at least one part of the main raw material.

The block material of the present embodiment is relatively porous, thereby bringing about the above-mentioned effects. Percentage of voids is not especially limited, however normally about 10 to 70% is the preferable percentage of voids.

Explanation will now be provided for a method of making block materials to be immersed in the sea.

Figure 5:
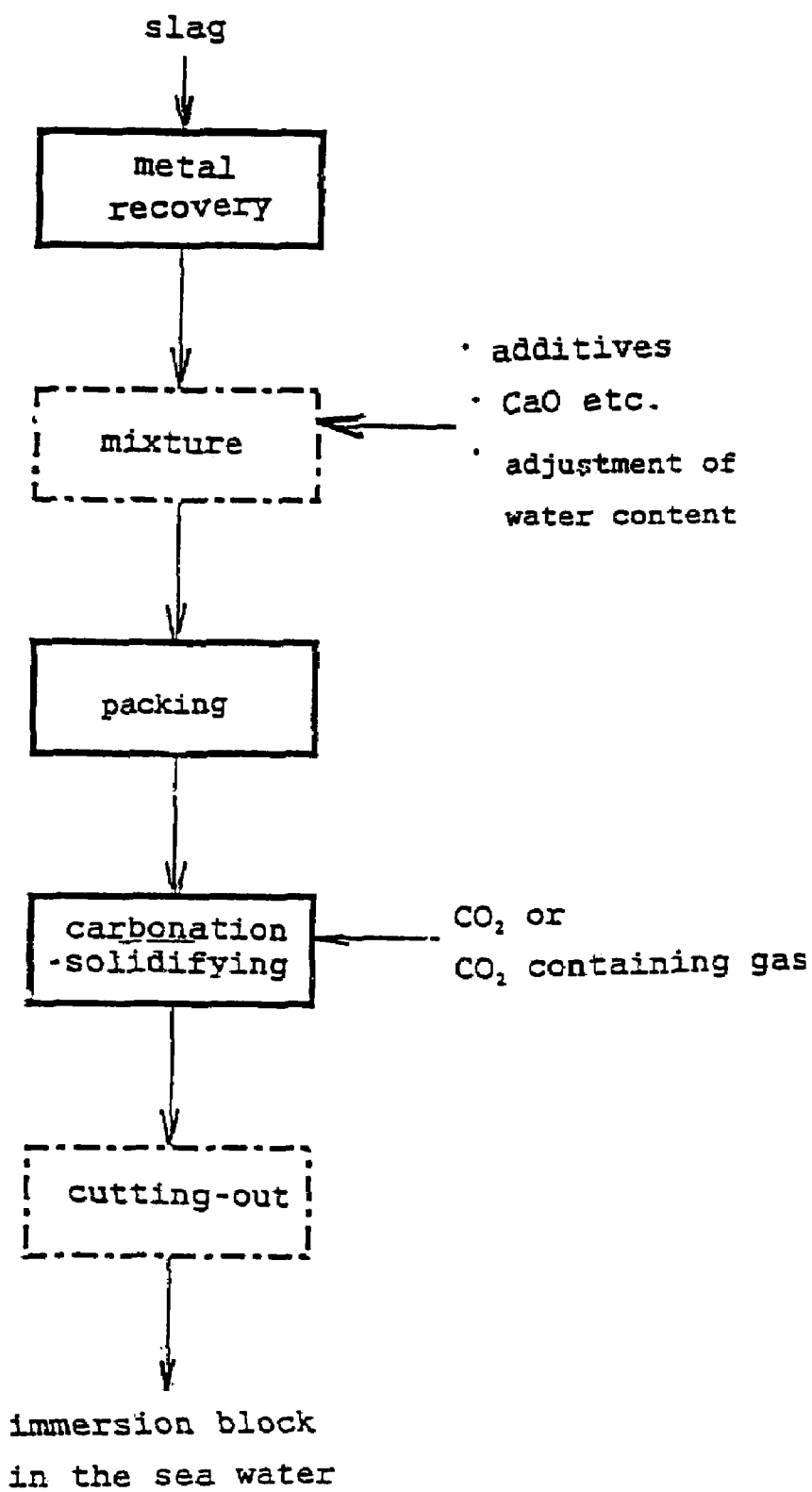
FIG. 5 is a schematic drawing showing a method according to the present invention of making a seawater immersion block.
Figure 6:
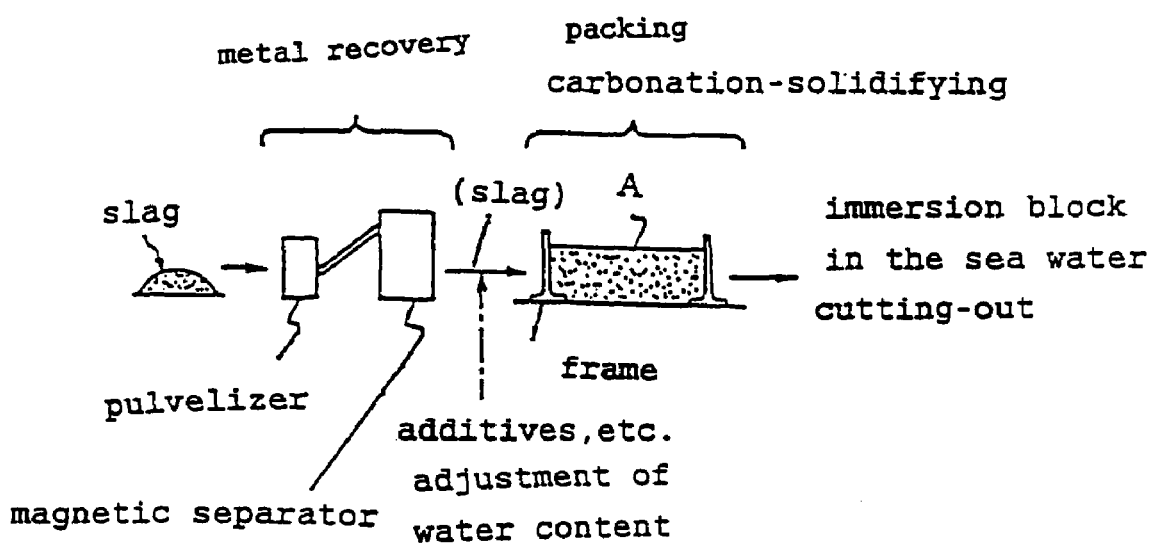
FIG. 6 is a schematic drawing showing an actual example of the method of FIG. 5.

FIG. 5 is one example showing the production flow of the inventive method, and FIG. 6 is one example showing the production procedure according to said flow. The slag generated in the iron-steel making process is at first subjected to a metal recovery where a considerable amount of the metal content is removed from the slag. Ordinarily, in this metal recovering process, the slag is pulverized into a grain size of cm-order or lower (for example, 5 cm or less) by such as a crusher to be grain, rough grain or small massive slags, followed by the metal recovery. The slag is sufficient with a grain size enabling recovery of the metal, and accordingly, if being relatively rough owing to properties of the slag, those enabling to recover the metal are pulverized to a degree enabling to remove the metal.

In the above mentioned metal recovery, the metal content in the slag after the recovering treatment may not be as low as a later mentioned metal removing treatment, and the metal of a proper amount may be left remaining. This is why the iron content in the slag in a proper amount is dissolved in the seawater, so that the iron content is supplied as a nutrient salt in the seawater, and this is useful for rearing marine algae. Thus, the metal content in slag is appropriately 3 wt. % or more after the recovering treatment.

There are some of slags brought in as stated where the slags are naturally destroyed to grain sizes enabling to recover the metal (namely, the naturally destroyed states in grain, rough grain or small massive grain), and the pulverizing treatment as mentioned above is not necessary therefor. For example, non-slagged CaO in the slag after cooling and solidifying reacts with the water content in air, rainwater or sprinkled cooling water and generates $Ca(OH)_2$, and by this generation the slag is expanded and destroyed, otherwise in a slag having a basicity ($CaO/SiO_2$) being near to 2, $2CaO.SiO_2(C_2S)$ is produced, and this $C_2S$ creates transforming expansion during cooling and the slag is destroyed or crushed. The slags which are naturally destroyed by these causes to grain sizes enabling to recover the metal may be practiced with the metal recovery.

Ordinarily, the metal recovering treatment is carried out by a magnetic separation of a magnetic separator (a method of removing the grain iron content from the slag by magnet), however no limitation is made thereto. For example, available is a gravity density method such as an air separation making use of a difference in specific gravity between the metal content and the slag content.

The metal recovering treatment recovers the metal content in the slag.

The slag having passed the above mentioned metal recovery is at least one slag selected from the group of the grain like slag, rough grain like slag and the small massive slag, and is sent to a subsequent carbonation solidification or a preparatory treatment. The raw slag is sufficient with at least one of slags selected from the group of the grain like slag, rough grain like slag and the small massive slag, and it is not a necessary condition to pass the metal recovering procedure.

Many slags which have passed the metal recovering process, contain the grain like slags or rough grain like slags more than a certain ratio, though being more or less. Therefore, even if the slag contains small massive slag grains of relatively large diameter, there is scarcely the possibility of causing hindrances in carbonation-solidifying the slag grains into a state having a predetermined strength, since grain or rough grain like slags pack spaces among the small massive slag grains. However, when the slag is composed of only substantially small massive slag grains, or when the ratio of the small massive slag grain occurring in the slag is relatively high, since the contacting areas of the slag grains are small, there might be a probability of causing hindrances in carbonation-solidifying the slag grains into a state having a predetermined strength. Therefore, it is preferable to adjust the grain size by increasing the ratio of the grain like slags or rough grain like slags.

The iron content in slag may be utilized as it is without recovering parts or all of the metal contained per se in the slag. However, in order to optionally control, as mentioned above, the iron content contained in the slag, in order to arbitrarily select shapes or sizes thereof, and in order to contain a preferable iron source such as grain iron, it is preferable to add the metallic iron and/or metal containing iron materials as additives, after removing all substantial parts in the slag (except inevitably non-removable metals) by a metal removing treatment.

The metal removing treatment is generally performed by pulverizing the slag by a pulverizer until obtaining mm-order or smaller (for example 5 mm or smaller) particles. The slag is sufficient with such sizes enabling to remove the metal and, accordingly, depending on the properties of the slags, those enabling to remove the metal in spite of being a relatively rough grain may be pulverized to sizes enabling to remove the metal. Slags being already grain or rough grain by natural pulverization do not often need a pulverizing treatment. In the metal removing treatment, except inevitably remaining metal content, the metal is preferably removed as much as possible. The metal content in slag is less than 3 wt. % after the removing treatment.

Ordinarily, the metal recovering treatment is carried out by a magnetic separation in a magnetic separator (a method of removing the grain iron content from the slag by a magnet), however no limitation is made thereto. For example, available is a gravity separation method such as an air separation making use of the difference in specific gravity between the metal content and the slag content.

To the slag having passed the metal removing treatment, the metallic iron as grain iron and/or the metal containing iron materials are added in the appropriate amounts for obtaining slag having an iron content of a desired amount containing metallic iron or the metal containing iron material. This slag is sent to the subsequent carbonation solidification or the preparatory treatment. As the metallic iron or the metal containing iron material to be added into the slag, the grain iron is optimum. As the grain iron, not only grain iron recovered from the slag, but also arbitrary grain iron from others can be used.

Figure 7:
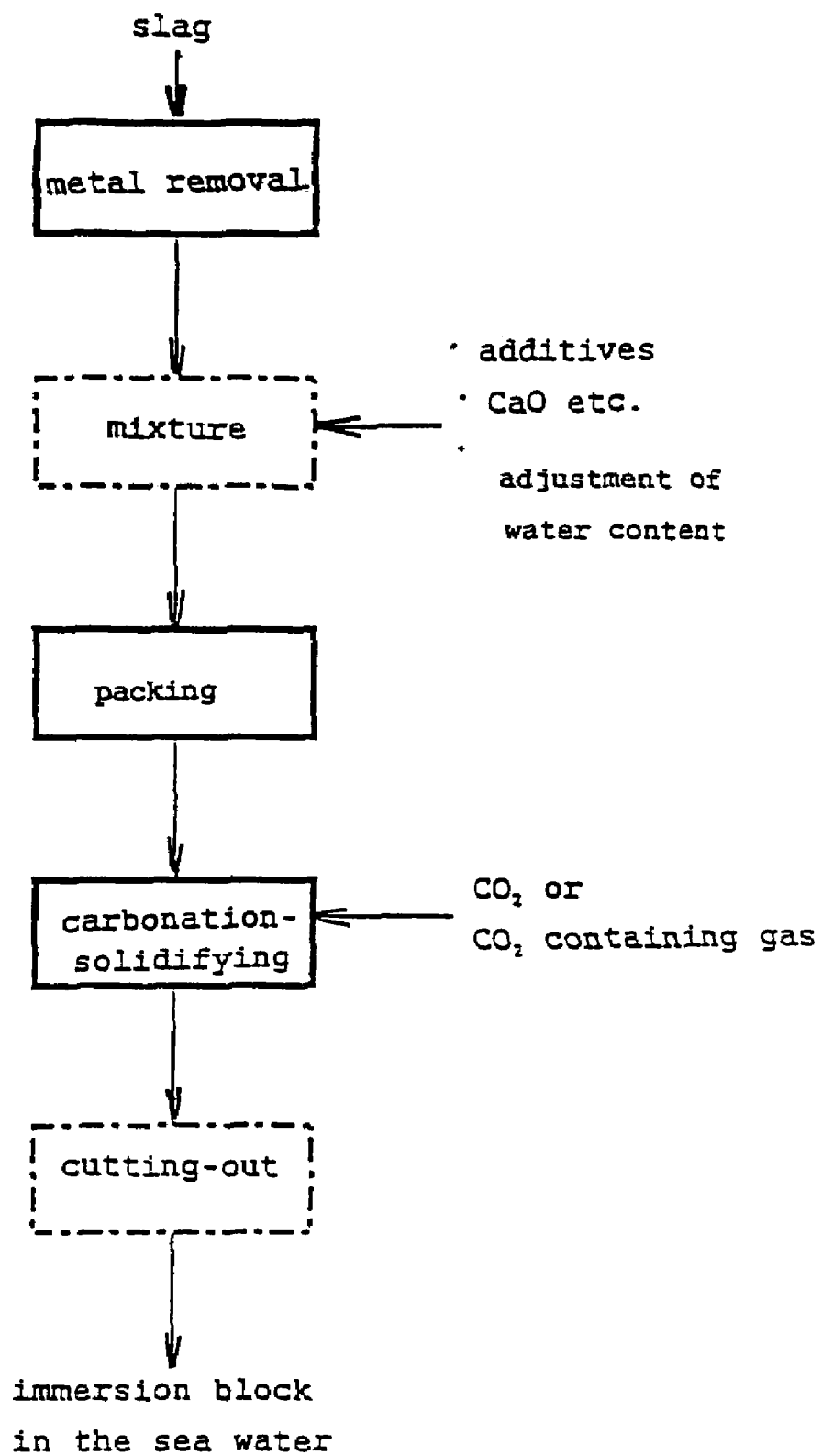
FIG. 7 is a schematic drawing showing another method according to the present invention of making a seawater immersion block.
Figure 8:
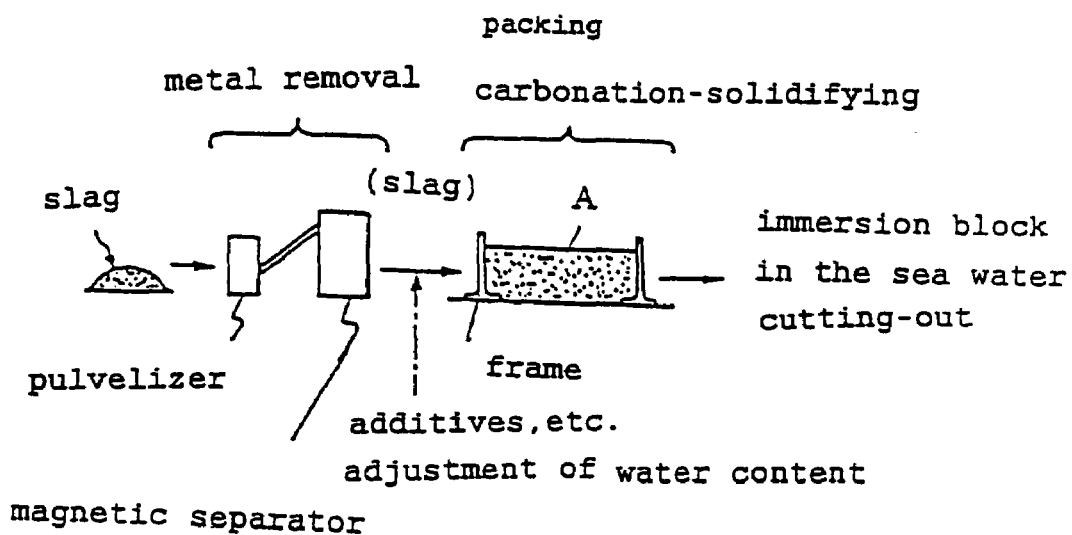
FIG. 8 is a schematic drawing showing an actual example of the method of FIG. 7.

FIG. 7 is one example of the production flow of producing the block materials to be immersed in the sea without adding metallic iron or the metal containing iron material after performing the metal removing treatment. FIG. 8 is one example showing the production procedure according to said flow. The slag generated in the iron-steel making process is at first subjected to the metal removing treatment for removing the main metal content. In general, the slag content and the metal in slag are closely entwined, and for the metal removing treatment, the slag should be pulverized in grain size or rough grain, and normally the slag is pulverized by the pulverizer to mm-order or lower (e.g., 5 mm or less). The slag is sufficient with such sizes enabling the removal of the metal and, accordingly, depending on properties of slags, those enabling the removal of the metal in spite of being relatively rough grain may be pulverized to sizes enabling to remove the metal.

In the metal removing treatment, except inevitably remaining metal content, the metal should be preferably removed as much as possible, and the metal content in slag is less than 3 wt. % after the recovering treatment.

As mentioned above, there are some slags brought in as stated where the slags are naturally destroyed to grain sizes enabling the recovery of the metal, and the pulverizing treatment as mentioned above is not necessary therefor. The causes of the natural destruction are as mentioned above, and the slags which are naturally destroyed by these causes to grain sizes enabling the recovery of the metal may be practiced with the metal recovery.

Ordinarily, the metal recovering treatment is carried out by a magnetic separation of the magnetic separator (a method of removing the grain iron content from the slag by magnet), however no limitation is made thereto. For example, available is a gravity separation method such as a wind separation making use of a difference in specific gravity between the metal content and the slag content.

The metal content in the slag is removed by the metal removing treatment.

The slag having passed the above mentioned metal removal is grain like slag and/or rough slag, and is sent to the subsequent carbonation solidification or the preparatory treatment thereof.

To at least one slag selected from the group of the grain like slag, the rough grain like slag and the small massive slag, otherwise the grain like slag and/or the rough grain like slag having passed the metal removing treatment, the additives are added if necessary. When CaO or MgO necessary for the carbonation reaction are insufficient in the slag, one kind or more selected from CaO, $Ca(OH)_2$, MgO and $Mg(OH)_2$ are added if required and mixed with the slag. As the additives, enumerated are such as grains or rough grains to be a soluble silica source (soluble silica or materials containing soluble silica), grains or rough grains to be an iron source (metallic iron, metal containing iron material, an oxidized iron or oxidized iron containing materials), or CaO. The specific examples are as mentioned above.

Among them, the soluble silica or the iron source (metallic iron or oxidized iron) is dissolved in the sea, thereby to usefully work to sustain the living of the marine algae. From the viewpoint of the dissolution in the sea water and to sustain the living of the marine algae, the metallic iron or the metal containing iron material among the iron sources are particularly preferable. However, in the case of blocks for sinking in the sea obtained from the grain like slag and/or rough grain like slag having passed the metal removing treatment, if the blocks are applied in such sea areas having problems regarding the shortage of oxygen in the sea water or an excessive supply of the iron content, the metallic iron or the metal containing iron material are not added.

Mixture of the slag and the additional raw materials such as the additives or CaO may depend on arbitrary methods, for example, a method of mixing the additional raw material and the slag exhaust from the metal recovering facility or the metal removing facility in a hopper, a method of adding the additional raw material to the slag having passed the metal removing treatment to mix in the metal recovering facility or the metal removing facility, a method of mixing by a heavy machinery as a shovel, or a method of mixing by a concrete mixer car (concrete agitator).

In this stage, the water content in slag may be adjusted as needed. The adjustment of water content will be referred to in detail later.

The slag which has been added with the additives as needed, mixed and adjusted in the water content is piled for carbonation solidification or filled up in optional spaces.

Herein, for piling the slags, it is sufficient to pile in the open air. However, it is preferable for the blown carbon dioxide to flow all over the piled mountains, and it is more preferable to cover the piled mountains with sheets for preventing the slag from scattering or fading by rainwater.

For piling or packing with the slag, available are pits encircling three corners with partitioning walls, frames or containers encircling four corners with the partitioning walls. When piling or packing with the slag within the pit, it is preferable to cover the piled or filled-up mountains with the sheets similarly to the open-air freighting. Further, when using a frame or container, it is desirable to cover the slag packed bed with the sheet or provide a cover body. FIGS. 6 and 8 show states where the packed bed A is formed within the frame.

The piling amount or the filling amount of the slag are not limited, and said amounts of several tons or several hundred tons are sufficient, or said amount corresponding to one piece of the block material or several pieces are enough. Thus the amount is optional. Although the piling or filling amount is much, if the piled mountain or the packed bed after the carbonation solidification are pulverized by heavy machinery, massive block materials can be cut out, and such cut-out massive blocks have merits of irregularity fractures for catching marine algae. From the viewpoint of productivity or functions as blocks for algae planting places or fish gathering rocky places, it is preferable that the slag piling or packing amounts are much to a certain degree.

The bulk density (compaction density) of the slag pile or layer is preferably adjusted in response to a density of block to be produced. Namely, the immersion block in the sea should be adjusted with respect to the density in response to conditions of the sea bottom. For example, in the case where the sea bottom is muddy or sludgy, blocks of relatively low density should be used so that the blocks are not immersed into the mud or sludge. On the other hand, in the case where the sea bottom is a reef, etc., blocks of relatively high density should be used so that the blocks are not carried away. Since the adherence of marine algae, the living degree thereof or dissolution of useful components from the interior of blocks are varied by the porosity (vacancy) of the block materials, it is often preferable to adjust the porosity of the blocks in response to conditions of the sea areas where the blocks are used.

The density of blocks to be produced by the method of the present embodiment depends on the bulk density (compaction density) of the piled mountain or packed bed, and so, it is possible to adjust the tightening degree of the piled mountain or packed bed, and by adjusting the bulk density, the density of block can be easily adjusted.

The tightening degree of the slag piled mountain or packed bed is optional, however ordinarily, the bulk specific gravity/true specific gravity ranges from 0.3 to 0.9, that is, the tightening is carried out to a degree that the vacancy within the piled mountain or packed bed is 70 to 10%.

The tightening may depend on a method of tightening the upper part of the piled mountain or packed bed or a method of giving vibration to tighten the piled mountain or packed bed. By adjusting the tightening degree, the density of the piled mountain or packed bed is adjusted. When producing the blocks of low density, the tightening is not performed, and the carbonation solidification is practiced as piled or filled up.

As actually tightening method, when tightening the piled mountain or packed bed within the above mentioned pit or molding frame, weighing lines for showing a target volume are marked on the interior of the pit, molding frame or container, and the slag whose weight is known is laid therein, and the tightening is continued until the upper face of the piled mountain or packed bed comes to the weighing line.

After completing the adjustment of the bulk specific gravity of the piled mountain or packed bed of slag, the carbonation reaction is caused in the piled mountain or packed bed under the existence of carbon dioxide for carbonation-solidifying the slag. Specifically, the carbon dioxide or the carbon dioxide containing gas is blown into the piled mountain, or packed bed of slag, otherwise the piled mountain or packed bed is laid under an atmosphere of carbon dioxide or a carbon dioxide containing gas for practicing the carbonation solidification of slag.

The above blowing manner is not especially limited, however it is most effective to equip a gas blowing instrument at the bottom of the piled mountain or packed bed and blow the gas through this instrument. Actually, gas supplying pipes or hoses are disposed at an appropriate pitch (e.g., 30 to 300 mm×40 to 400 mm) in the bottom of the mountain or layer (if using the pits, molding frames or containers, in beds thereof) for blowing the carbon dioxide or the carbon dioxide-containing gas.

Further, as the manner for laying the mountain or layer in the atmosphere of the carbon dioxide or the carbon dioxide containing gas, the mountain or layer are laid in air-tight spaces (including the container), into which the carbon dioxide or the carbon dioxide containing gas is supplied by an arbitrary embodiment.

As the carbon dioxide containing gas to be employed, the suited examples are as follows. That is to say, an exhaust gas (normally, $CO_2$: around 25%) from a limestone baking plant of an integrated iron making work or an exhaust gas form a reheating furnace (normally, $CO_2$: around 6.5%) can be used. However no limitation is made thereto. If the concentration of carbon dioxide in the carbon dioxide containing gas is too low, a problem occurs that the treating efficiency is decreased, however no other problem appears. Thus, the concentration of carbon dioxide is not limited, however for efficient treating, it is preferably 3% or higher.

The gas blowing amount of the carbon dioxide or the carbon dioxide containing gas is not limited either and, as an ordinary standard, it is good to use a gas blowing amount of about 0.004 to 0.5 $m^3$/min·t. In addition, there is no limitation especially required for the gas blowing time (carbonation treating time) and, as a standard, it is desirable to blow the gas until the blowing amount of carbon dioxide ($CO_2$) reaches 3% or more of the weight of the slag, that is, until carbon dioxide ($CO_2$) of 15 $m^3$ or more per 1 ton of a material in terms of the gas amount is supplied.

The carbon dioxide or the carbon dioxide containing gas to be blown into the piled mountain or packed bed of slag is sufficient at room temperature and, if the gas exceeds room temperature, this is better for reactivity. An upper limit of the gas temperature is a temperature for decomposing $CaCO_3$ into CaO and $CO_2$ or $MgCO_3$ into MgO and $CO_2$, and when using gas at a high temperature, gas at a temperature of not bringing about such decompositions should be used. An optimum temperature for actual operation is necessarily determined by taking conditions of the water content or other conditions into consideration.

For carbonation-solidifying the slag by utilizing the reaction of CaO, MgO and carbon dioxide, a water content is necessary, and the optimum water content is varied according to the grains of slags, however it is suitable to have about a 3 to 10% water content rate in slag immediately before starting the carbonation treatment. This is because the carbonation reaction is accelerated by dissolving CaO, MgO and carbon dioxide in the water. Therefor, it is preferable to adjust the water content in slag to be an optimum value so as to cause the carbonation reaction under the existence of carbon dioxide. If the water content in slag is too low, desirably water is added to the slag in the mixing courses of FIGS. 5 and 7 for adjusting the water content for heightening the amount of water contained in slag. If the carbon dioxide or the carbon dioxide containing gas is once blown into the water to saturate $H_2O$, followed by blowing it into the piled mountain or packed bed, the slag is prevented from being dried to accelerate the carbonation reaction. Further, it is sufficient to adjust the water content in mixture to be a value at which a compression strength of a massive substance is at a maximum after the carbonation treatment. This value of the water content is obtained as follows.

(a) A raw slag of more than 3 standard is prepared, where a water of an optional amount of more than a water absorption rate of the raw slag grain is added to 100 wt parts of the raw slag. The above mentioned water absorption rate is that of a fine aggregate or coarse aggregate specified by JIS A1109 or A 1110.

(b) Respective raw slag is charged in the molding frame so that the porosity under the drying condition is kept to be constant and homogeneous, and the charged layers are formed.

(c) The charged layer is blown with carbon dioxide gas humidified at 10 to 40° C. at a determined amount for practicing carbonation curing for a fixed time so as to solidify the raw slag.

(d) The compression strength of the solidified slag is measured for obtaining a maximum value thereof. The value of the water content corresponding to the maximum value is the optimum water content.

By supplying the carbon dioxide or the carbon dioxide containing gas into the piled mountain or the charged layer of the slag, $CaCO_3$ or $MgCO_3$ is produced by the reaction between CaO (or $Ca(OH)_2$) or MgO (or $Mg(OH)_2$) and the carbon dioxide $CaCO_3$ or $CaCO_3$ and $MgCO_3$ are rendered to be binders for solidifying the slag grain (if the additive is mixed, the slag grain and additive grain).

After completion of the carbonation solidification, the piled mountain or the charged layer are broken into required sizes by heavy machinery, and cut out into massive block materials to be immersed in the sea. Ordinarily, the blocks are cut out into sizes of 80 to 1500 mm. By this pulverization when cutting out, the blocks have fractures of irregularities for easily catching marine algae.

In the method of the present embodiment, by a sufficient small volume of charged layer, it can be utilized as the block material as it is, without cutting out.

The production method of this embodiment has the following merits.

(1) Since the carbonation solidification is practiced under the conditions of piling the slag in a mountain or a charging layer, the density of the immersion block in the sea can be easily adjusted by adjusting the tightening degree of the piled mountain or the charged layer for adjusting the bulk specific gravity. As mentioned above, the blocks should be adjusted in the density or the porosity in response to conditions of the sea bottom or current, and as the production method, it is a big merit that the adjustment can be arbitrarily and easily carried out. A conventionally known technique is to carbonation-solidify granulates, which is however difficult to adjust the density of non-treated materials in wide ranges.

(2) The method of this embodiment carries out the carbonation solidification under the condition of piling or charging the slag in a mountain or a layer, breaks the carbonation-solidified mountain or layer for cutting out the massive blocks into desired sizes or utilizes the charged layer as blocks as they are. So, by appropriately selecting sizes of the cut-out blocks or the charged layer, the blocks of optional sizes (for example, 80 to 1500 mm) can be obtained, and large massive blocks especially suited to algae planting places or fish gathering rocky places can be easily obtained. In the prior art of carbonation-solidifying granulated pellets, sizes of obtained massive products are 30 to 50 mm at the most, besides inevitably producing massive ones of a small size. Thus, as the production method of the sea-immersion blocks, it is a big advantage that large massive blocks can be obtained.

(3) After the carbonation solidification, the piled mountain or the charged layer are broken by heavy machinery, and cut out into massive block materials, so that the blocks have surfaces (fractures) of irregularities for easily catching marine algae.

The block materials can exhibit excellent characteristic when using them for algae planting places, building beaches, or fish gathering rocky places, and of course they can be used for other purposes, for example, as blocks for sea bottom mound, improving or purifying qualities of the sea bottom. Also when the blocks are used for such purposes, the excellent effects as mentioned above are exhibited for living marine algae.

EXAMPLE 3

A converter slag powder (containing small massive slags produced by the metal recovery, iron content: 12 wt. %) of a maximum diameter about 30 mm, and a grain size of 5 mm or smaller and being about 70 wt. %, was piled 1.5 m in a pit of 4 m width×6 m depth, and moderately tightened. Then the pit was closed and blown with carbon dioxide 50 $Nm^3$/hr for 3 days so as to solidify the slag. The carbonation-solidified slag was broken and divided by heavy machinery to produce massive block materials of about 1.0 to 1.5 m for algae planting places.

As a comparative example, mortar was poured into the molding frame of 1.5 m×1.5 m×1.5 m, and the solidified concrete block was divided into two by a breaker (rock drill) to produce blocks having fractured faces for an algae planting place.

A sea bottom, which was 4 m deep and near a natural algae planting place, was selected as a place for building a testing algae planting place. 15 pieces of the block materials of the above example and 20 pieces of blocks of the comparative example were immersed in a scope of diameter being about 10 m. The blocks of the comparative example were immersed turning the fractured faces upward. A period of the seasons for sinking blocks was selected just before spending spores from the natural marine algae planting place in order that sedimentary substances did not cover the block surfaces before adhered spores thereto.

As a result of investigating the places of sinking blocks after about one year, it was confirmed that marine algae adhered to all the blocks and lived. The living amount of algae was surveyed by an investigation of a crop estimate by unit acreage sampling, and it was confirmed that the humid weight of the blocks of the comparative example was 956 g/$m^2$, while the humid weight of the blocks of the example was 1121 g/$m^2$, and that the blocks of the invention were better in adhering rate and for sustaining the living properties of algae.

EXAMPLE 4

A converter slag grain like (having passed the metal recovery, iron content: 2 wt. %) of grain size being 3 mm or smaller, was piled 1.5 m in a pit of 4 m width×6 m depth, and moderately tightened. Then the pit was closed and blown with carbon dioxide 50 $Nm^3$/hr for 3 days so as to solidify the slag. The carbonation-solidified slag was broken and divided by heavy machinery to produce the massive block materials of about 1.0 to 1.5 m for algae planting places.

As a comparative example, mortar was poured into the molding frame of 1.5 m×1.5 m×1.5 m, and the solidified concrete block was divided into two by a breaker (rock drill) to produce blocks having fractured faces for the algae planting place.

A sea bottom of 4 m deep near a natural algae planting place was selected as a place for building a testing algae planting place. 15 pieces of the block materials of the above example and 20 pieces of blocks of the comparative example were immersed in a scope of diameter being about 10 m. The blocks of the comparative example were immersed turning the fractured faces upward. A period of the seasons for sinking blocks was selected just before spending spores from the natural marine algae planting place in order that sedimentary substances did not cover the block surfaces before spores adhered thereto.

As a result of investigating the places of sinking after about one year, it was confirmed that marine algae adhered to all the blocks and lived. The living amount of algae was surveyed by an investigation of a crop estimate by unit acreage sampling, and it was confirmed that the humid weight of the blocks of the comparative example was 579 g/m$^2$, while the humid weight of the blocks of the example was 695 g/m$^2$, and that the blocks of the invention were better in adhering rate and sustaining the living properties of algae.

According to the above mentioned present embodiments, neither an increase of the pH in the sea water or a shortage in oxygen are encountered, and when using them for algae planting places, building beaches, or fish gathering rocky places, the block materials can exhibit an excellent performance also for sustaining the living of marine algae, and in addition, it is possible to offer the block materials for sinking in the sea water which are adjustable in size and density.

Further, according to the sea water immersion block of the invention using raw slag having passed a metal recovering treatment, in addition to the above mentioned effects, in the sea areas necessary to suppress the shortage of oxygen in sea water owing to the oxidation of iron content in slag or the excessive supply of iron content into the sea water, it is possible to effectively suppress the shortage of oxygen in the sea water owing to the oxidation of iron content in slag or the excessive supply of iron content into the sea water.

In particular, in the production method of the present embodiments, as the carbonation solidification is carried out under the conditions of piling or packing the slags, it is possible to produce sea water immersion blocks of optional density and sizes easily and at a low cost by adjusting the degree of tightening of the piled mountain or the charged layer, or appropriately selecting sizes of the carbonation-solidified blocks to be cut out.

There are some slags which have a property to be floured by a transforming expansion of γ-dicalcium silicate generated when cooling, or expansion caused by hydration of free CaO. Conventionally, such floured slag has not been used other than being partially utilized as raw materials for cements, and major parts were wasted. However in the present embodiments, floured slag can be utilized as a raw material. Further, with respect to slags (for example, dephosphorized slag or desilicated slag) having difficulties in usefully using them as cement raw materials owing to restraints in compositions, the inventive method can use them as the raw material. Thus, this is a very profitable invention also in a regard of usefully using slags generated in the iron-steel making process.

River Water Immersion Block and Production Method Thereof

The inventors made experiments and investigations, and as a result, they found the following facts.

(1) Grain like slags, rough grain like slags or small massive slags, in particular such slags moderately containing iron content are consolidated with a binder of $CaCO_3$ or $CaCO_3$ and $MgCO_3$ produced by a carbonation reaction, and the thus consolidated massive slag is used as river immersion blocks. It was found that such blocks exhibit, when used as sinking blocks, excellent effects in forming spaces for living fishes or the rearing of water living plants as algae without increasing the pH of the river water, or to above all display particularly excellent effects in moving of other water living creatures than fishes or rearing of water living plants, when sinking or laying blocks to artificially structural parts or artificial river beds such as fish ways to be equipped to dams or barrages of rivers.

(2) On the other hand, for a river-flowing area which necessitates controlling the shortage of oxygen in the river water owing to oxidation of iron content or excessive supply of iron content into the river water, the grain like or rough grain like slags having passed the metal removing treatment are consolidated with a binder of $CaCO_3$ or $CaCO_3$ and $MgCO_3$ produced by carbonation reaction, and the thus consolidated massive slag is used as river immersion blocks, thereby displaying excellent effects in the rearing of algae without causing a shortage of oxygen in the river water owing to the oxidation of iron content or excessive supply of iron content into the river water or increasing the pH of the river water.

(3) For obtaining the massive-immersion blocks in the river water as mentioned above, such a production method is useful which consolidates the above mentioned slags by piling or packing at a desired density the grain like slag, the rough grain like slag or the small massive slag, otherwise the grain like or rough grain like slag having passed a metal removing treatment, and by causing the carbonation reaction in the piled mountain or packed bed under the existence of carbon dioxide. According to this production method, it is possible to produce blocks of arbitrary density and size in response to conditions of river beds or water-flowing to be applied with blocks, and to produce blocks of arbitrary density and sizes in response to purposes for river beds or fish ways at low cost.

The present embodiment is characterized as follows.

(1) The embodiment is concerned with immersion blocks in the rivers of a main raw material being a slag produced in the iron-steel making process, and is characterized by a consolidating the slag with a binder of $CaCO_3$ produced by carbonation reaction, and making the slag massive. This slag is at least one selected from the group of the grain like slag, the rough grain like slag and the small massive slag. The present slag is sufficient with grain like or rough grain like slag having passed a metal removing treatment.

(2) The embodiment is concerned with immersion blocks in the rivers of a main raw material being a slag generated in the iron-steel making process, and is characterized by consolidating the slag with a binder of $CaCO_3$ and $MgCO_3$ produced by a carbonation reaction, and making the slag massive. The embodiment includes a case where $MgCO_3$ exists as a hydrate, hydroxide salt or double salt. This slag is at least one selected from the group of the grain like slag, the rough grain like slag and the small massive slag. The present slag is sufficient with grain like or rough grain like slag having passed a metal removing treatment.

(3) The embodiment is concerned with immersion blocks in the rivers of main raw materials being a slag generated in the iron-steel making process, grain like additives and/or rough grain additives, and is characterized by consolidating a mixture of the slag and the additives with a binder of $CaCO_3$ produced by a carbonation reaction, and making the slag massive. This slag is at least one selected from the group of the grain like slag, the rough grain like slag and the small massive slag. The present slag is sufficient with grain like or rough grain like slag having passed a metal removing treatment.

(4) The embodiment is concerned with immersion blocks in the rivers of main raw materials being a slag generated in the iron-steel making process, grain like additives and/or rough grain additives, is characterized by consolidating a mixture of the slag and the additives with a binder of $CaCO_3$ and $MgCO_3$ produced by a carbonation reaction, and making the slag massive. The embodiment includes a case where $MgCO_3$ exists as a hydrate, hydroxide salt or double salt. This slag is at least one selected from the group of the grain like slag, the rough grain like slag and the small massive slag. The present slag is sufficient with grain like or rough grain like slag having passed a metal removing treatment.

(5) A method of making immersion blocks in the river water is characterized in that the slag generated in the iron-steel making process is, as needed, mixed with one kind or more selected from CaO, $Ca(OH)_2$, MgO and $Mg(OH)_2$, and the slag is piled, or the packed bed is formed in an arbitrary space, and is caused with the carbonation reaction under the existence of carbon dioxide so as to consolidate the slag for providing blocks of the massive slag. This slag is at least one selected from the group of the grain like slag, the rough grain like slag and the small massive slag. The present slag is sufficient with grain like or rough grain like slag having passed a metal removing treatment.

(6) A method of making immersion blocks in the river water is characterized in that the slag generated in the iron-steel making process is mixed with grain like additives and/or rough grain additives and is, as needed, mixed with one kind or more selected from CaO, $Ca(OH)_2$, MgO and $Mg(OH)_2$, and the slag is piled or the packed bed is formed in an arbitrary space, and is caused with the carbonation reaction under the existence of carbon dioxide so as to consolidate the slag for providing blocks of the massive slag. This slag is at least one selected from the group of the grain like slag, the rough grain like slag and the small massive slag. The present slag is sufficient with grain like or rough grain like slag having passed a metal removing treatment.

The present embodiment is concerned with the immersion blocks in the river water of a main raw material being a slag generated in the iron-steel making process. As the slag generated in the iron-steel making process, there may be enumerated slags from blast furnaces such as a slowly cooled slag or a water granulated slag therefrom; slags from the iron-steel making process such as dephosphorized slag, desulfurized slag, desiliconized slag, decarburized slag or casting slag generated in pre-treatments, a converter or casting; slags from iron ore reduction; or slags from electric furnaces. However, no limit is provided to them. Slags mixed with two kinds or more of slags may be used.

The slags generated in the iron-steel making process as mentioned above contain relatively much metal (iron content as grain iron) though more or less (ordinarily, around several wt. % to 30 wt. %), and metals in slags are pulverized to recover for recycling the iron content to the iron-steel making process. Accordingly, including the grain like, rough grain like or small massive slags, the slags having passed a metal recovering process are necessarily the grain like, rough grain like or small massive slags. Ordinarily, grain sizes of the slag having passed the metal recovering process are at cm-order or less (for example, 5 cm or less).

The present embodiment employs at least one of these grain like, rough grain like or massive slags for rivers-immersion blocks.

The slag to be employed in the invention is sufficient with at least one of the grain like, rough grain like or massive slags, and it is not a necessary condition to pass a metal recovery treatment.

When these slags are rendered to be raw materials of the river immersion blocks, the iron containing amount is not required to be low as the case where a slag having passed a metal removing treatment is rendered to be a raw material of a block. Rather, it is better that the iron content of a proper amount (particularly, metallic iron or alloyed iron material such as grain iron) is contained in slag. This is why the iron content contained in the slag in a proper amount is dissolved in river water, so that the iron content is supplied as a nutrient salt in river water, and this usefully works for rearing marine algae. Thus, the iron content in slag is appropriately 3 wt % or more.

Depending on circumstances of river areas to be immersed with blocks, in cases of problems concerning the shortage of oxygen in the river water owing to the oxidation of iron content in slag or the excessive supply of iron content into the river water, the slag to be used is subjected to a metal removing treatment and is used as a raw material of a block material without adding metal iron or the metal including iron material.

The slags generated in the iron-steel making process as mentioned above contain relatively much metal though more or less, and the metals in slags are recovered at considerable degree by the metal recovering treatment. However since the slag content and the metal are mixed as being entwined, the metal cannot be completely removed by a pulverizing treatment of such degree as an ordinary metal recovering process, and so a considerable amount of metal remains in the slag after the metal recovering process. Therefore, if sinking in the river blocks obtained from the slag having passed only a metal recovery, problems will arise concerning the shortage of oxygen in the river water owing to the oxidation of iron content in slag or the excessive supply of iron content into the river water. Thus, for blocks to be applied to such river areas, the slags to be raw material are those which have removed main metal by passing a metal removing treatment.

Since the slag content and the metal are mixed in slag as being entwined, it is necessary to remove the metal (by a magnetic separation) under conditions of having pulverized slags into grain or rough grain. Including slags of grain or rough grain states per se, the slag having passed a metal removing treatment becomes inevitably grain or rough grain. Ordinarily, a slag passing the metal removing treatment has a grain size of mm-order or less (for example, 5 mm or lower).

Therefore, for the river immersion blocks of the invention to be applied in the river areas involved with the problems concerning the shortage of oxygen in the river water owing to the oxidation of iron content in slag or the excessive supply of iron content into the river water, the raw material is the slag shaped in grain and/or rough grain having passed a metal recovering treatment.

In the metal removing treatment, metals in slags are desirably removed as much as possible, except inevitably removable metals. Normally, the iron content (metal) in slag is preferably less than 3 wt. %.

In the present embodiment, it was found that the main raw material is at least one slag selected from a group of grain like slag, rough grain like slag and small massive slag, or the slag of grain and/or rough grain having passed a metal removing treatment, and this is consolidated (carbonation solidification) as a binder of $CaCO_3$ or $CaCO_3$ and $MgCO_3$, and the massive blocks are very suited materials as blocks for sinking to river beds, above all as artificially structural parts such as fish ways or artificial river beds.

In general, the slag generated in the iron-steel making process contains a considerable amount of CaO (ordinarily, 20 to 60 wt. %), and the block materials to be immersed in rivers according to the present invention are those produced by changing, into $CaCO_3$, at least one slag selected from the group of the grain like slag, the rough grain like slag and the small massive slag, otherwise CaO or Ca(OH)$_2$ modified from this CaO (including as needed CaO, Ca(OH)$_2$) contained in grain like slag and/or the rough grain like slag, and consolidating to make massive the slag grains (if containing the additives, grain or slag grain) with the binder of CaCO$_3$.

Major parts of slags contain a certain amount of MgO together with CaO, and the block materials to be immersed in rivers according to the present embodiment where such slag is the raw material, changes MgO or Mg(OH)$_2$ modified from this MgO (including as needed MgO, Mg(OH)$_2$) into MgCO$_3$ by the above mentioned carbonation reaction, and consolidating to make massive the slag grains (if containing the additives, grain or slag grain) with a binder of MgCO$_3$ and CaCO$_3$.

With respect to the slag generated in the iron-steel making process, parts or all of CaO or MgO contained therein are sometimes changed into Ca(OH)$_2$ or Mg(OH)$_2$ by water absorption as time passes or other causes, however this is no problem for the block to be utilized in the invention, and Ca(OH)$_2$ or Mg(OH)$_2$ are changed into CaCO$_3$ or MgCO$_3$ as immersion blocks in rivers.

The river immersion blocks of the present embodiment are used as river beds or fish ways. The embodiment of installing blocks in the water is arbitrary as not only merely sinking but also fixing them to structural parts.

The river immersion block materials of the present embodiment are particularly suited as immersion blocks or laid to the artificially structural parts or artificial river beds as blocks for fish ways, and the blocks for the fish way are laid or fixedly laid to the bottom of the fish way. Other than the fish way, the blocks may be fixedly laid to optional structural parts such as the upper face of an artificially structural part where the water flows (for example, moderately oblique face of the artificially structural part composing part or all of the head-neck of a barrage) or a fixedly structured artificial river bed (for example, river beds constructed by block tightening or rockwork).

The embodiment (sizes or shapes) for using the river immersion blocks is optional, and the sizes may be selected in response to usage from orders of 1000 mm or larger to orders of several ten mm. When fixedly laying the blocks to the fish ways, other artificially structural parts or artificial river beds, in order that an construction is easily carried out, and as cases may be, the blocks are fixedly laid only with rockworks, it is desirable to use the blocks in a block, panel, tile or similar shape (fixedly formed material). Also in the fish ways, it is sufficient to use the blocks in an embodiment of simply sinking the massive blocks of a non-fixed form on the bottom thereof.

Figure 9A:
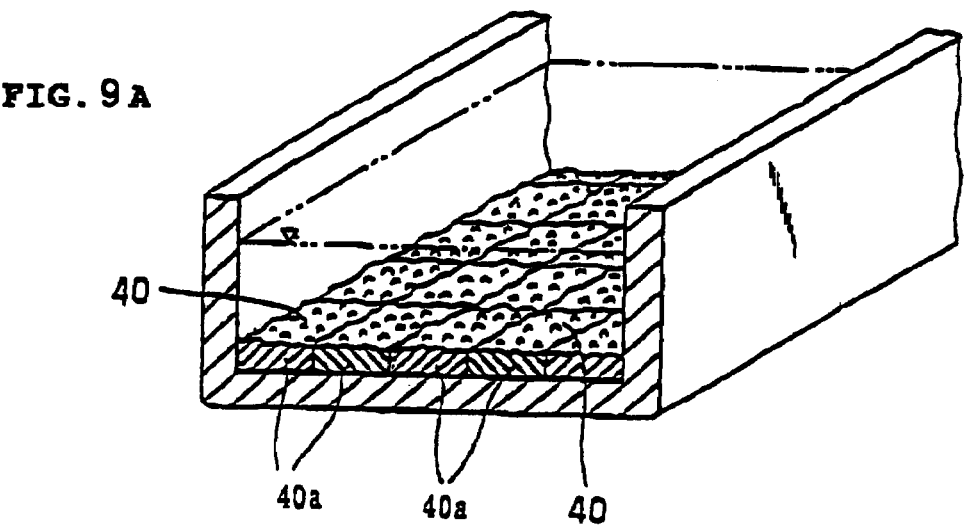
FIGS. 9A, 9B and 9C are schematic drawings showing structural examples where river water immersion blocks are laid or built on artificial structural parts or artificial riverbeds, such as a fish way.
Figure 9B:
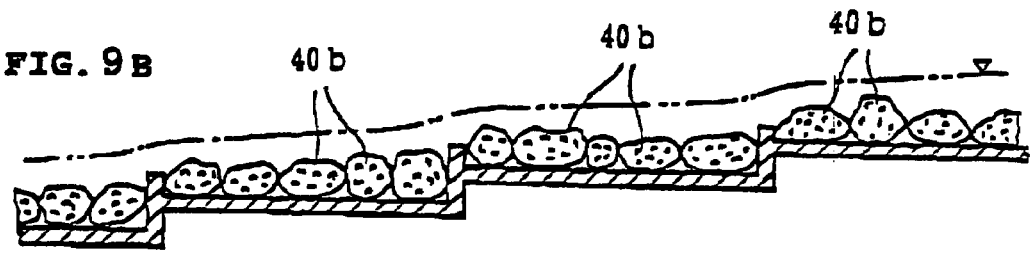
Figure 9C:
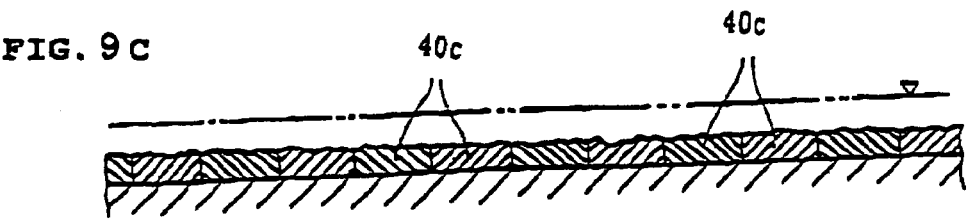

FIGS. 9(*a*) to (*c*) show structural examples when the blocks of the invention are immersed or laid on the artificially structural part or the artificial river bed of such as fish ways, in which (a) is an example where the block materials 40*a* in block or panel shape are fixedly laid on the fish way of oblique road system. For fixing the blocks 40*a*, mortar may be used as needed. In this example, the blocks of the bottom have fractures 40 (cracked or ruptured faces). The fractures 40 are cracked or ruptured faces formed when the blocks provided by the carbonation solidification are cracked or ruptured, and as those are more irregular than as carbonation solidified faces, they are effective for water living creatures to move. FIG. 9(*b*) is an example of sinking the massive blocks 40*b* non-fixedly on the bottoms (respective steps) of the stepwise fish way. FIG. 9(*c*) is an example sinking the massive blocks 40*c* of block or panel shape fixedly on the artificially structural parts or the artificial river bed other than the fish way. As the artificially structural part other than the fish way applicable with such structure, for example, the moderately oblique face composing the head-neck of such as barrages may be listed up.

The river immersion block have merits as follows as block materials to be immersed or laid on the river bed.

(1) Major parts of CaO (or Ca(OH)$_2$ produced from CaO) is changed into CaCO$_3$, and so it is possible to prevent algae from delaying of adhering or living by an increase of pH of the river water or around the block materials. In general, the pH of natural blocks (limestone) is around 9.3 and the pH of concrete is around 12 to 12.5, and the river immersion block of the invention can be at a pH 10 or lower as a natural block by a neutralizing reaction at production.

(2) The massive slag obtained by carbonation-solidifying the grain like slag and/or the rough grain like slag have porous properties as a whole (surface and interior), so that such as algae are easily attach the surfaces of blocks. Besides, since the interior of block is also porous, elements contained in blocks useful to growing and accelerating of the algae are easily dissolved, and the growth of algae is good.

(3) When using massive slags per se as immersion blocks, because of restraints of cooling methods or conditions of molten slags, the dimensions of slag are limited (ordinarily, about 800 mm at maximum), and it is difficult to provide large massive blocks of regular sizes. On the other hand, the size of blocks obtained by carbonation solidifying the slag and/or the rough grain like slag, can be arbitrarily adjusted by selecting shapes when carbonation-solidifying or selecting cut shapes after the carbonation solidification, and it is possible to easily obtain blocks of arbitrary sizes such as middle massive blocks or small massive blocks (broken blocks).

(4) It is preferable to use immersion blocks in rivers of optimum density (specific gravity) in response to conditions of the river bottom or the water flowing speed. In this regard, the density of blocks obtained by carbonation solidifying the grain like slag and/or the rough grain like slag having passed a metal removing treatment, can be arbitrarily adjusted by appropriately adjusting the bulk density (compaction density).

(5) In the case of blocks for sinking in the rivers obtained from the grain like slag and/or rough grain like slag having passed the metal removing treatment, since the main metal content is removed, if the blocks are applied in such river areas having problems concerning the shortage in oxygen of the river water or excessive supply of the iron content, there occurs no problem of the shortage in oxygen of the river water by oxidation of the metal or the excessive supply of the iron content by dissolution thereof. Further, the blocks for sinking in the rivers obtained from slag having the metal removed have relatively much components attributing to the carbonation solidification of the slag by an amount of the metal removal, and those are useful for securing strength.

(6) The blocks of the invention are ordinarily cut out from the consolidated and piled mountain or charged layer, so that the block have rocky rugged forms, and when those are immersed or laid on the river bed, they are easy to make large spaces between blocks or the river bed and the blocks in comparison with natural round blocks or similar natural blocks seen at rivers, and so useful living and resting spaces for water living creatures are easily formed.

Further, as mentioned above, the river immersion block of the invention are very suited above all as artificially structural parts such as fish ways or the artificial river beds (hereinafter, an explanation will be made concerning a block for a fish way) in applications to the rivers, and in such applications, the blocks have the following merits.

(7) Surfaces of massive blocks obtained by carbonation-solidifying the grain like slag and/or rough grain like slag are porous, and when sinking or laying them to the bottoms of the fish ways, water living creatures (for example, crusts or water living insects) which move by catching with their claws the riverbed (surface projections as: block or water living plants) can easily move. In particular, the blocks of the invention have porous and rugged surfaces, and also the pH as that of a natural block, and are ready for dissolving useful components, so that water living plants are easily adhere and live on the block surfaces, so that water living creatures more easily move in the fish way.

(8) When using a stone for a fish way, it is sufficient to merely sink the massive blocks within the fish way, however preferably, the blocks molded in a block or panel are fixedly laid on the bottom of the fish way. In this regard, since the blocks provided by carbonation-solidifying the grain or rough grain like slag can be arbitrarily formed at production, block or panel shapes are easily formed, and if employing such blocks, the construction is easy to fixedly and exactly lay the blocks on the bottom of the fish way.

(9) In comparison with a conventional foamed concrete, the construction may be carried out at low cost, the pH is lower than that of the concrete, and it is desirable for water living creatures moving along the bottom of the fish way.

As the river immersion block of the invention is consolidated as the binder of $CaCO_3$ or $CaCO_3$ and $MgCO_3$, it has sufficient strength, so that even if a shock is affected while transferring or when sinking to lay a block, cracks or destruction do not occur for a long period of year.

For providing suited compositions in response to places to be applied, it is possible to contain various kinds of additives (grain, rough grain or small massive additives) together with the grain like slag and/or the rough grain like slag. As the additives, for example, enumerated are such as grains or rough grains to be a soluble silica source (soluble silica or soluble silica containing materials), grains or rough grains to be an oxidized iron source (oxidized iron or oxidized iron containing materials).

The soluble silica or the iron source (iron or oxidized iron) contained in the immersion blocks in the rivers is dissolved in the water, thereby to usefully work to sustain the living of algae.

As grains or rough grains to be the soluble silica source, present are the soluble silica and/or the material containing the soluble silica of the grain or rough grain. As the material containing the soluble silica, fly ash or clinker ash may be used which are generated by coal combustion in such as a thermal power station. The fly ash contains soluble silica in an amount of 45 to 75 wt. %, while the clinker ash contains 50 to 65 wt. %.

The water granulated slag from a blast furnace also contains relatively much soluble silica, and if parts or all of the slag are rendered to be the water granulated slag, for example, if a slag from steel making and the water granulated slag are mixed, a similar effect is brought about to the case of adding the additive to be the soluble silica source.

As the grain or the rough grain to be the oxidized iron source, present are the grain like or rough grain like oxidized iron and/or the oxidized iron containing material, and in particular, cheaply available grain or rough grain are iron containing dusts generated in an iron-steel making process. The iron containing dust is generally a dust from iron making, and ordinarily contains oxidized iron of around 75% in terms of Fe. Mill scales also contain oxidized iron of around 70% in terms of Fe.

When obtaining blocks of relatively low specific gravity, it is useful to use a water granulated slag of small specific gravity as at least one part of the main raw material.

The river immersion block material of the present embodiment is relatively porous, thereby bringing about the above mentioned effects (2). The percentage of voids is not especially limited, however normally, around 10 to 70% is a preferable percentage of voids.

Explanation will be made to a method of making block materials to be immersed in rivers.

Figure 10:
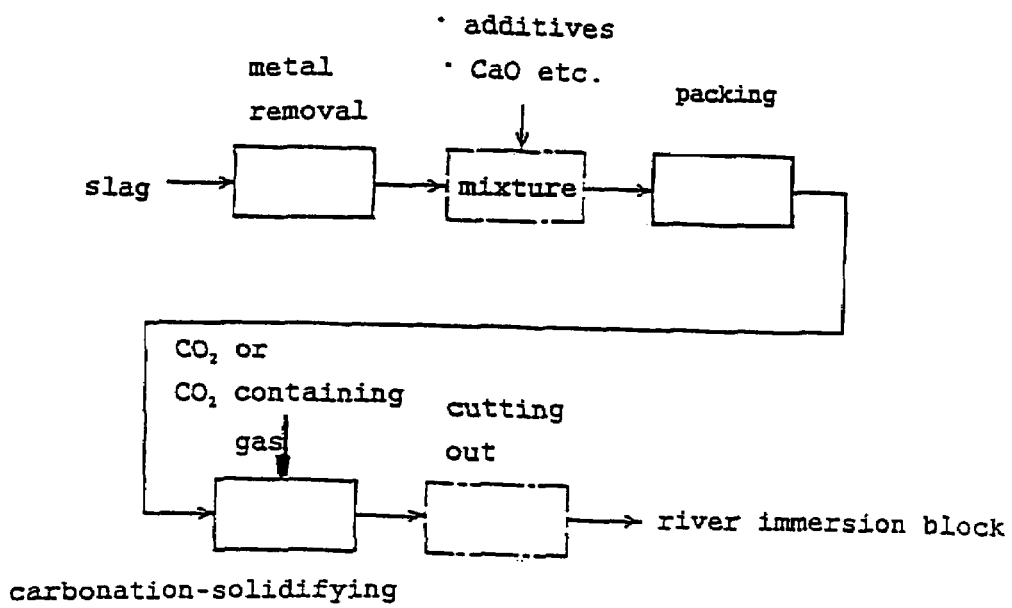
FIG. 10 is a schematic drawing showing a method of making a river water immersion block according to the present invention.
Figure 11:
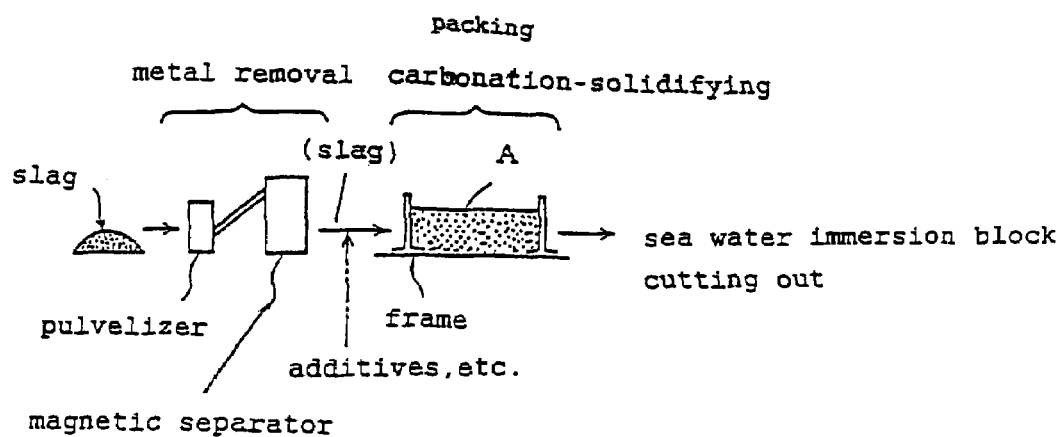
FIG. 11 is a schematic drawing showing an actual example of a method of making a river water immersion block according to the present invention.

FIG. 10 is one example showing the production flow of the inventive method, and FIG. 11 is one example showing the production procedure. The slag generated in the iron-steel making process is at first subjected to metal recovery to remove the main metal (grain iron). Ordinarily, since the slag content in slag and the metal are closely entangled, a metal recovering treatment should be carried out on the grain or rough grain like slag, and therefore, the slag is pulverized by such as a pulverizer to be mm-order or lower (for example, 5 mm or less), followed by a metal removing treatment. The slag is sufficient with grain sizes enabling the metal removing treatment, and accordingly, if being relatively rough owing to properties of the slag, those enabling recovery of the metal are pulverized to a degree enabling to remove the metal.

There are some slags brought in as stated where the slags are naturally destroyed to grain sizes enabling recovery of the metal, and the pulverizing treatment as mentioned above is not necessary therefor.

Ordinarily, the metal removing treatment is carried out by a magnetic separation of the magnetic separator (a method of removing the grain iron content from the slag by a magnet), however no limitation is made thereto. For example, available is a gravity density method such as an air separation making use of a difference in specific gravity between the metal content and the slag content.

The metal content in the slag is removed by a metal removing treatment.

The grain like slag and/or the rough grain like slag having passed a metal removing treatment are added with the additives if required, and CaO or MgO necessary for carbonation reaction are short in the slag, one kind or more selected from CaO, $Ca(OH)_2$, MgO and $Mg(OH)_2$ are added as required and mixed with the slag. As the additives, for example, added are such as grains or rough grains to be a soluble silica source (soluble silica or soluble silica containing materials), grains or rough grains to be oxidized iron source (oxidized iron or oxidized iron containing materials) and CaO. Specific examples thereof are as mentioned above.

Mixture of the slag and the additive raw materials such as the additives or CaO may depend on arbitrary methods, for example, a method of mixing the addition raw material and the slag exhausted from a metal removing facility in a hopper, a method of adding the addition raw material to the slag having passed a metal removing treatment to mix in the metal removing facility, a method of mixing by a heavy machinery as a shovel, or a method of mixing by a concrete mixer car (concrete agitator).

The slag, which has been added with the additives as needed and mixed, is piled for carbonation solidification or filled up in optional spaces.

Herein, for piling, an open-air freighting is sufficient, and it is preferable to cover the piled mountains with sheets such that the blown carbon dioxide flows allover the piled mountains, and for preventing the slag from scattering or fading by rainwater.

For piling or packing the slag, available are pits encircling three corners with partitioning walls, molding frames or containers encircling four corners with the partitioning walls. When piling or packing the slag within the pit, it is preferable to cover the piled or filled-up mountains with the sheets similarly to the open-air freighting. Further, when using the molding frame or container, it is desirable to cover the slag packed bed with the sheet or provide a cover body. FIG. 11 shows a state where the packed bed A is formed within the frame.

The piling amount or the packing amount of the slag are not limited, and said amounts of several tons or several hundred tons are sufficient, or said amount corresponding to one piece of the block material or several pieces are enough. Thus the amount is optional. Although the piling or filling amount is much, if the piled mountain or the packed bed after the carbonation solidification are pulverized by the heavy machinery, massive block materials can be cut out, and such cut-out massive blocks have merits of irregular fractures for catching algae. From the viewpoint of productivity and function as river immersion blocks, it is preferable that the slag piling or packing amounts are much to a certain degree. Specifically, scales of 10 tons or more are desirable.

The bulk density (compaction density) of the slag pile or layer is preferably adjusted in response to a density of block to be produced. Namely, the immersion block in rivers should be adjusted with respect to the density in response to conditions of the river bottom or the water flowing. Since the adherence of algae, the living degree thereof or dissolution of useful components from the interior of blocks are varied by the porosity (vacancy) of the block materials, it is often preferable to adjust the porosity of the blocks in response to conditions of the rivers where the blocks are used.

The density of block to be produced by the method of the present embodiment depends on the bulk density (compaction density) of the piled mountain or packed bed, and so, it is possible to adjust the tightening degree of the piled mountain or packed bed, and by adjusting the bulk density, the density of block can be easily adjusted.

The tightening degree of the slag piled mountain or packed bed is optional, however ordinarily, the bulk specific gravity/true specific gravity ranges from 0.3 to 0.9, that is, the tightening is carried out to a degree that the vacancy within the piled mountain or packed bed is 70 to 10%.

The tightening may depend on a method of tightening the upper part of the piled mountain or packed bed or a method of providing vibration to tighten the piled mountain or packed bed. By adjusting the tightening degree, the density of the piled mountain or packed bed is adjusted. When producing blocks of low density, the tightening is not performed, and the carbonation solidification is practiced as piled or filled up.

As an actual tightening method, when tightening the piled mountain or packed bed within the above mentioned pit or molding frame, weighing lines for showing a target volume are marked on the interior of the pit, a molding frame or container, and the slag whose weight is known is laid therein, and the tightening is continued until the upper face of the piled mountain or packed bed comes to the weighing line.

After completing the adjustment of the bulk specific gravity of the piled mountain or packed bed of slag, the carbonation reaction occurs in the piled mountain or packed bed under the existence of carbon dioxide for carbonation-solidifying the slag. Specifically, carbon dioxide or a carbon dioxide containing gas is blown into the piled mountain or packed bed of slag, otherwise the piled mountain or packed bed is laid under an atmosphere of carbon dioxide or a carbon dioxide containing gas for carrying out the carbonation solidification of slag.

The above blowing manner is not especially limited, however it is most effective to equip a gas blowing instrument at the bottom of the piled mountain or packed bed and blow the gas through this instrument. Actually, gas supplying pipes or hoses are disposed at an appropriate pitch (e.g., 300 mm to 400 mm) in the bottom of the mountain or layer (if using the pits, molding frames or containers, in beds thereof) for blowing the carbon dioxide or the carbon dioxide containing gas.

Further, as the manner for laying the mountain or layer in the atmosphere of the carbon dioxide or the carbon dioxide containing gas, the mountain or layer are laid in air-tight spaces (including the container), into which the carbon dioxide or the carbon dioxide containing gas is supplied by an arbitrary embodiment.

As the carbon dioxide containing gas to be employed, suited are, for example, an exhaust gas from a limestone baking plant (normally, $CO_2$: around 25%) or an exhaust gas from reheating furnace (normally, $CO_2$: around 6.5%) of an integrated steel making works. However no limitation is made thereto. If the concentration of carbon dioxide in the carbon dioxide containing gas is too low, a problem occurs that the treating efficiency is decreased, however no other problem appears. Thus, the concentration of carbon dioxide is not limited, however for efficiently treating, it is preferably 3% or higher.

The gas blowing amount of the carbon dioxide or the carbon dioxide containing gas is not limited, either, and as an ordinary standard, it is good to use a gas blowing amount of around 0.004 to 0.5 $m^3$/min·t. In addition, there is no limitation especially required for the gas blowing time (carbonation treating time), and as a standard, it is desirable to blow the gas until the blowing amount of carbon dioxide ($CO_2$) reaches 3% or more of the weight of the slag, that is, until carbon dioxide ($CO_2$) of 15 $m^3$ or more per 1 ton of a material in terms of the gas amount is supplied.

The carbon dioxide or the carbon dioxide containing gas to be blown into the piled mountain or packed bed of slag is sufficient at room temperature, and if the gas exceeds room temperature, this is better for reactivity. An upper limit of the gas temperature is a temperature for decomposing $CaCO_3$ into CaO and $CO_2$ or $MgCO_3$ into MgO and $CO_2$, and when using gas at high temperature, gas at a temperature of not bringing about such decompositions should be used.

For carbonation-solidifying the slag by utilizing the reaction of CaO, MgO and carbon dioxide, a water content is necessary, and it is desirable to have around a 3 to 10% water content ratio in the slag immediately before starting the carbonation treatment. This is because the carbonation reaction is accelerated by dissolving CaO, MgO and carbon dioxide in the water. Therefore, if the water content in slag for composing the piled mountain or charged layer is too low, the water may be added to the slag in the mixing course of FIG. 6 for adjusting the water content for heightening the amount of water contained in slag. If the carbon dioxide or the carbon dioxide containing gas is once blown into the water to saturate $H_2O$, followed by blowing it into the piled mountain or packed bed, the slag is prevented from being dried to accelerate the carbonation reaction.

Further, it is sufficient to adjust the water content in mixture to be a value at which a compression strength of a massive substance is at a maximum after the carbonation treatment. This value of the water content is obtained as follows.

(a) A raw slag of more than 3 standard is prepared, where water of an optional amount of more than a water absorption rate of the raw slag grain is added to 100 wt parts of the raw slag. The above mentioned water absorption rate is that of a fine aggregate or a coarse aggregate specified by JIS A1109 or A 1110.

(b) Respective raw slags are charged in the molding frames so that the porosity at drying is kept to be constant and homogenous, and the charged layers are formed.

(c) The charged layer is blown with carbon dioxide gas humidified at 10 to 40° C. at a determined amount for practicing carbonation curing for a fixed time so as to solidify the raw slag.

(d) The compression strength of the solidified slag is measured for obtaining a maximum value thereof. The value of the water content corresponding to the maximum value is the optimum water content.

By supplying the carbon dioxide or the carbon dioxide containing gas into the piled mountain or the charged layer of the slag, $CaCO_3$ or $MgCO_3$ is produced by the reaction between CaO (or $Ca(OH)_2$) or MgO (or $Mg(OH)_2$) and the carbon dioxide. $CaCO_3$ or $CaCO_3$ and $MgCO_3$ are rendered to be binders for solidifying the slag grain (if the additive is mixed, the slag grain and additive grain).

After completion of the carbonation solidification, the piled mountain or the charged layer are broken into required sizes by heavy machinery, and cut out into massive block materials to be immersed in the sea. Ordinarily, the blocks are cut out into sizes of 80 to 1500 mm. By this pulverization when cutting out, the blocks have fractures of irregularities for easily catching such as algae.

In the method of the present embodiment, if the volume of charged layer is sufficiently small, it needs no cutting out. It can be utilized as the block material as it is divided into two parts. For example, this case may be applied to production of the block or panel shaped blocks, and if dividing into two parts by pulverizing or breaking the carbonation-solidified block blocks, two pieces of block like or panel like blocks having fractures on the surfaces may be produced.

The production method of the present invention has the following merits.

(1) Since the carbonation solidification is practiced under the conditions of piling the slag in a mountain or a charging layer, the density of the immersion block in rivers can be easily adjusted by adjusting the tightening degree of the piled mountain or the charged layer for adjusting the bulk specific gravity. As mentioned above, the blocks should be adjusted in the density or the porosity in response to conditions of the river bottom or water flowing, and as the production method of the blocks it is a big merit that the adjustment can be arbitrarily and easily carried out. A conventionally known technique is to carbonation-solidify granulates, which is however difficult to adjust the density of non-treated materials in wide ranges.

(2) The method of the present invention carries out the carbonation solidification under the condition of piling or charging the slag in a mountain or a layer, breaks the carbonation-solidified mountain or layer for cutting out the massive blocks into desired sizes or utilizes the charged layer as blocks as they are, or divides into massive blocks. So, by appropriately selecting sizes of the cut-out blocks or the charged layer, the blocks of optional sizes (for example, 80 to 1500 mm) can be obtained, and large massive blocks can be easily obtained. In the prior art of carbonation-solidifying granulated pellets, sizes of obtained massive products are 30 to 50 mm at the most, besides inevitably producing massive ones of a small size. Thus, as the production method of river immersion blocks, it is a big advantage that large massive blocks can be obtained.

(3) When fixedly laying blocks to artificially structural parts or artificial river beds of fish ways, the blocks to be employed are desirably shaped in a block or a panel, and in the inventive method, by appropriately selecting sizes or shapes of the charged layer, such shaped blocks can be easily produced.

(4) After the carbonation solidification, the piled mountain or the charged layer of the slag are broken by heavy machinery, and cut out into massive block materials, so that the blocks, which have surfaces (fractures) of irregularities for easily catching algae, can be obtained. Further, with respect to the block or panel shaped blocks of the above (3), if dividing into two parts by pulverizing or breaking the carbonation-solidified blocks, two pieces of a block like or a panel like block having fractures on the surfaces may be produced.

EXAMPLE 5

A grain like converter slag of grain size being 3 mm or smaller, was piled 1.5 m in a pit of 4 m width×6 m depth, and moderately tightened, then the pit was closed and blown with carbon dioxide 50 $Nm^3$/hr for 3 days so as to solidify the slag. The carbonation-solidified slag was broken by heavy machinery to produce the massive block materials having a size of about 30 to 250 mm with enough strength as river immersion blocks.

EXAMPLE 6

The raw material was dephosphorized slag grain like of a diameter of 6 mm or less being 100 wt. %, and blocks for fish ways were produced by the following two methods.

(1) The grain like slag was charged in porous molding frames of 50 cm×50 cm×15 cm, and tightened, and then 60 pieces of frames were set within the pit such that spaces were created between the frames. The pit was closed and blown with carbon dioxide of 70 $Nm^3$/hr for 5 days for solidifying the slag. After that, the molding frames were taken off, and the block shaped blocks for fish ways were obtained.

(2) The grain like slag was charged in porous molding frames of 100 cm×100 cm×50 cm. For charging, at intermediate positions of 100 cm width of the molding frames, polyethylene made partitions opening at the central parts were interposed (100 cm×100 cm×2 mm, and opening: 85 cm×85 cm). The grain like slab was charged, and the wholes were tightened. 18 pieces of molding frames were set within the pit such that spaces were created between the frames. The pit was closed and blown with carbon dioxide of 70 $Nm^3$/hr for 5 days for solidifying the slag. After that, the molding frames were taken off, and the obtained block shaped blocks were broken into two pieces at the central parts interposing the partitions, having fractures (broken faces) on the upper surfaces.

The block shaped blocks for fish ways produced by the above (1) and (2) were laid as embodied in FIG. 9A on the bottom of the fish way constructed with concrete. Incidentally, the blocks (2) for the fish way were laid such that the fractures composed the bottom of the fish way. Thereby, differently from smooth bottom parts as the concrete (concrete block or concrete construction), the obtained fish way had the porous and rugged rough bottom for shells easily moving.

As the inventive block of the invention is almost equal pH as the natural block by neutralizing reaction at production, there is not such a phenomenon that the concrete-made fish way heightens pH in the surface by elements dissolved at starting the use after construction, and algae are delayed in adhering to. As the bottom of the fish way composed of the inventive blocks has the porous and rugged rough face, it was confirmed that algae adhered to the bottom and lived in a relatively short period.

As mentioned above, according to the above mentioned present embodiments, neither a shortage in oxygen in the river water or an increase of pH are encountered, and when sinking or laying as blocks for river beds, the block materials can exhibit excellent performance in forming living spaces for fishes or rearing of water living plants such as algae, and in addition, those display special functions in the moving of other creatures than fishes or rearing of water living plants when sinking or laying them on artificially structural parts or artificial beds provided at dams or barrages. Also it is possible to offer the block materials for sinking in the rivers which are adjustable in size and density.

In particular, in the production method of the present invention, since the carbonation solidification is carried out under the conditions of piling or packing the slags, it is possible to produce a river immersion block of optional density and size easily and at a low cost by adjusting the degree of tightening of the piled mountain or the charged layer, or appropriately selecting sizes of the carbonation-solidified blocks to be cut out. Especially, for the repairing of river beds, an enormous amount of blocks are required, however according to the present invention, blocks can be supplied at low cost, in comparison with cases of using natural blocks or concrete materials. Thus, the cost of construction can be curtailed.

There are some slags which have a property to be floured by a transforming expansion of γ-dicalcium silicate generated when cooling, or expansion caused by hydration of free CaO. Conventionally, such floured slag has been difficult to use as materials, however in the present embodiments, a floured slag can be utilized as a raw material. Further, this is a very profitable invention also in a regard of usefully using slags generated in the iron-steel making process.

Creating Method of Algae Places

The inventors noticed an increasing power or an increasing action of marine algae in existing algae planting places, and got an idea of making use of existing algae planting places per se in adhering and living of seeds and saplings of marine algae to bases. That is, the inventors had the idea of temporarily laying materials to be bases for creating algae places so as to cause seeds and saplings to naturally adhere and live on the surfaces of materials for utilizing these materials as bases for creating algae planting places. As a result of having made experiments and studies based on this idea, they found that if materials of blocks were laid in existing algae planting places, marine algae adhered and lived on the surfaces of materials in a relatively short period of day. Further, if materials with algae living were moved as seeding materials to places of creating algae planting places, and at the same time new materials (marine algae not adhering) were placed around their circumferences, marine algae of seeding materials increased on the circumferential materials, and formed units of a community of algae comprising the algae planting places.

With respect to the materials to be bases for creating the algae planting places including the above seeding materials, suitable properties of materials were investigated, and it was found that if a material had a weight of a degree not to be brought up by the sea current, however, enabling to stay on the sea bottom, the properties were of no problem, and preferable were such materials of surface properties for easily catching spores or seeds of marine algae, namely, surfaces having ruggedness or projections. Above all, very suited as materials were artificially made blocks where slag generated in the iron-steel making process was made massive through a special technique, exhibiting excellent effects also in sustaining the living of marine algae.

The present embodiment has the following characteristics.

A method of creating or improving algae planting places, characterized by temporarily sinking materials comprising weighty substances on existing algae planting places, adhering and rearing marine algae on the surfaces of said materials, then recovering the materials for creating algae planting places or moving as seeding materials to places for increasing marine algae, and disposing other materials around said seeding materials for increasing marine algae of said seeding material on said other materials.

As the above mentioned materials, it is preferable to employ artificially made blocks as follows.

(a) An artificially made block of a main raw material being a slag generated in an iron-steel making process, where the slag is consolidated with a binder of $CaCO_3$ produced by a carbonation reaction, and made massive. This slag is at least one selected from the group consisting of grain like slag, rough grain like slag and small massive slag. The slag is sufficient with grain like slag or rough grain like slag having passed a metal removing treatment.

(b) An artificially made block of a main raw material being a slag generated in an iron-steel making process, where the slag is consolidated with a binder of $CaCO_3$ and $MgCO_3$ produced by a carbonation reaction, and made massive. The embodiment includes a case where $MgCO_3$ exists as a hydrate, hydroxide salt or double salt. The slag is at least one selected from the group consisting of grain like slag, rough grain like slag and small massive slag. The slag is sufficient with grain like or rough grain like slag having passed a metal removing treatment.

(c) An artificially made block of a main raw material being a slag generated in an iron-steel making process, grain like additives and/or rough grain additives, where a mixture of the slag and the additives is consolidated with a binder of $CaCO_3$ produced by a carbonation reaction, and made massive. This slag is at least one selected from the group consisting of grain like slag, the rough grain like slag and small massive slag. The slag is sufficient with grain like or rough grain like slag having passed a metal removing treatment.

(d) An artificially made block of a main raw material being a slag generated in an iron-steel making process, grain like additives and/or rough grain additives, where a mixture of the slag and the additives is consolidated with a binder of $CaCO_3$ and $MgCO_3$ produced by a carbonation reaction, and made massive. The embodiment includes a case where $MgCO_3$ exists as a hydrate, hydroxide salt or double salt. This slag is at least one selected from the group consisting of grain like slag, rough grain like slag and small massive slag. The slag is sufficient with grain like or rough grain like slag having passed the metal removing treatment.

Other than creating algae planting places in such lands where algae do not grow or are decayed, these embodied methods may be applied for improving (rearing the algae) places where algae planting places are decaying.

A detailed explanation will be made to a method of creating algae planting places (or improving method).

In the present embodiment, at first, materials to be seeding materials are temporarily immersed in the existing algae places (in particular preferably, natural algae places). As an existing algae place, first of all, a natural algae place exists in circumstances where marine algae are easy to increase (circumstances of light, water quality or ocean current governing growth of algae) in comparison with places where algae do not naturally live, and besides the algae planting place is a site where seeds or spores (zoospore) released from algae exist in the highest density. Accordingly, an existing algae place is the site most suited for adhering and rearing algae on the surfaces of the materials.

The materials to be immersed to the algae planting places are of no problem regarding material properties or shapes, if the materials have a weight of a degree not to be brought up by the ocean current, however, enabling to stay on the sea bottom. As the materials, if, for example, natural blocks, artificial blocks (including massive slag or concrete blocks), metallic materials (e.g., steel materials or cast products), plastic materials, or their compound materials, exceed a specific gravity being 1, no problem is involved with material properties. Further, shapes are not especially limited, and appropriate forms may be selected as massive, lengthy, block, plate, or one material in a basket or a net of plural massive substances.

Materials having ruggedness or indentations on the surfaces are easy for adhering spores seeds of marine algae, and rooting germs. When the material is a block, it is most desirable to form the rugged surface with a broken face when pulverizing. As the broken face of the block material is formed with countless ruggedness, the adhering of spores seeds of marine algae and the living of germs are good.

Especially preferable are artificially made blocks which will be referred to in detail.

In regard to materials other than one material which is made by packing plural massive substances in a basket or a net, when temporarily sinking said materials, it is convenient to wrap them in nets for pulling up or attach pulling-up instruments (such as wire rope) for making later recovery easy.

As to a period of season for temporarily sinking materials to the algae planting places, it is desirable to select a period when marine algae in the algae planting places actively release spores or seeds. On the surfaces of the immersion blocks, algae usually adhere and grow in several months to around one year, and some of those fast growing develop to mature making spores or seeds, or grow up nearly it. As mentioned above, existing algae plating places (especially natural algae places) have the most actively increasing property of marine algae on the material surfaces in the circumferential aspect and in regard of closely existing of spores and seeds, and so algae can be rooted on the material surfaces in a relatively short period of a month.

When algae adhere to and live on the surfaces, the materials are pulled up for recovery. The materials are transferred as keeping algae living on the material surfaces to places for building algae planting places (or improving algae planting places), and are again immersed as seeding materials. At the same time, new materials (that is, other materials for adhering marine algae) are immersed around the seeding materials. Then, for example, the seeding materials are laid one to two pieces in a range of around 10 m×10 m, and new materials are disposed around them under a relatively close condition. Further, bases are built on which new materials are piled, and seeding materials are laid therein or incorporated in the bases. The inventive method includes such a case in the embodiments of sinking new materials around seeding materials.

In general, places for creating algae planting sites are at a sea bottom of a depth of 20 m or lower, and the creating work may be carried out by a procedure of sinking to the sea bottom new materials conveyed by a ship and not yet adhering marine algae for making bases, and then suspending seeding materials.

Properties, tendencies or forms of new materials to be immersed are similar to those of materials to be the above-mentioned seeding materials. Different materials in properties, tendencies or forms may be employed.

According to such method of creating the algae planting places, spores or seeds released from algae of the seed materials adhere to the neighboring materials, grow ordinarily in a relatively short period of around one year, and form units of community. Therefore, materials to be adhered with algae are immersed allover places for planting algae, and among them said seeding materials are dotted, whereby creation of algae planting places can be performed easily and in a short term, though be large scaled places.

The method of this embodiment may be said to be a method of creating algae planting place provided with the advantages of the conventional methods and with further improved advantages. Namely, the inventive method makes use of an increasing action of marine algae in existing algae planting places for adhering and rearing algae in materials to be seeding material for building algae planting places, and similarly to the conventional methods of transplanting seeds and saplings to materials, the inventive method can exactly cause marine algae to root materials, and can create algae planting places which exactly increase algae in a relatively short term in comparison with the maintenance free method of creating algae planting places. In addition, the inventive method has a merit of widely selecting ranges for making algae planting places.

Beside, the method of this embodiment which adheres and rears algae to materials in sites most suitable for germinating and growing in the circumstances of algae planting places, so that algae living on the material surfaces are good in growing and rooting. Therefore, the present method is high in probability of surviving and living than the conventional method of transplanting seeds and saplings of marine algae to materials, and has a big advantage of scarcely requiring growth management after the transplanting.

On the other hand, the method of this embodiment is different from the conventional maintenance free method of creating algae planting places only in that materials to be seed materials are temporarily immersed for a certain period in the existing algae planting place, and are recovered to be moved to places for creating algae planting sites, hardly requiring other artificial works or a growth management of the marine algae. Thus, this method may be said to have simplicity and economics in cost near to the conventional maintenance free method of creating algae planting places.

Further reference will be made to the suitable materials as those to be employed in the method of the embodiments.

As the material (for the seeding material and for the base creating algae planting places), is an artificially made block of a main raw material being a slag generated in an iron-steel making process, where the slag is consolidated with a binder of $CaCO_3$ or $CaCO_3$ and $MgCO_3$ is produced by a carbonation reaction, and made massive. It is found that such massive block for an algae planting place does not involve a shortage of oxygen or increase of pH, and displays excellent effects also in the rearing of marine algae.

Further, the artificially massive block can be easily produced by piling or packing grain like or rough grain like slag in a desired density and causing a carbonation reaction in the piled mountain or packed bed under the existence of carbon dioxide, thereby solidifying grain like or rough grain like slag. The block material produced by this method can be adjusted to the desired density and size in response to the conditions of the sea bottom or ocean currents to be applied, and can be easily made massive.

Specifically, the above-mentioned artificially made block has the following advantages.

Since the main metal content (grain iron) is removed, the block does not involve a shortage of oxygen in the seawater owing to oxidation of the iron content.

Major parts of CaO (or $Ca(OH)_2$ produced from CaO) contained in the slag are changed into $CaCO_3$, it is possible to avoid an increase of pH in the sea water by CaO.

The massive slag obtained by carbonation-solidifying the grain like slag and/or the rough grain like slag, has porous properties as a whole (surface and interior), so that the marine algae easily attach to the surfaces of blocks. Besides, since the interior of block is also porous, elements contained in blocks useful for the growing and accelerating of the algae (for example, soluble silica or oxidized iron content) are easily dissolved in the seawater. Therefore, those can effectively accelerate the growing of the marine algae in comparison with the case of using massive slags per se for building sea-immersion blocks or concrete products where the slag is an agglomerate.

In particular, in the method of this embodiment, it is necessary to effectively accelerate the adherence and rearing of algae to the materials temporarily immersed in the existing algae planting place, the increase and living of algae on the materials disposed around the seeding materials, and above all to accelerate the living of young algae on the block surfaces. In this regard, since useful elements dissolve in the water from the immersion blocks, such effectively works if individuals of the marine algae are near thereto, and are very useful to sustain the living of young algae. Consequently, the useful elements enable the young algae to promote to breed efficiently, and this invention can provide higher effectiveness.

When using massive slags per se as immersion blocks for algae planting places, because of restraints of cooling methods or conditions of molten slags, dimensions of the slag are limited (ordinarily, about 800 mm at maximum), and it is difficult to provide large massive blocks of regular sizes. On the other hand, the size of blocks obtained by carbonation solidifying grain like slag and/or rough grain like slag, can be arbitrarily adjusted by selecting shapes during carbonation-solidifying or by selecting cut shapes after the carbonation solidification, and it is possible to easily obtain large massive blocks particularly suited to algae planting places.

It is preferable to use immersion blocks in the sea of an optimum density (specific gravity) in response to conditions of the sea bottom or ocean currents. For example, when sinking blocks of a large density to sea bottoms such as a piling of sludge, the blocks are immersed into the sludge and cannot serve as bases of algae places. In this regard, the density of blocks obtained by carbonation solidifying grain like slag or rough grain like slag having passed a metal removing treatment, can be arbitrarily adjusted by appropriately adjusting the bulk density (compaction density) of the slag during carbonation solidifying.

As the slags to be main raw materials of the above mentioned artificially made blocks, there may be enumerated slags from blast furnaces such as a slowly cooled slag or a water granulated slag therefrom; slags from an iron-steel making process such as dephosphorized slag, desulfurized slag desiliconized slag, decarburized slag or casting slag generated in a pretreatment, a converter or casting; slags from iron ore reduction; or slags from electric furnaces. However, no limit is provided on them. Slags mixed with two kinds or more of slag may be used.

In general, the slag generated in an iron-steel making process contains, a considerable amount of CaO (ordinarily, 20 wt % to 60 wt %). The artificial block is produced by changing CaO or $Ca(OH)_2$ changed from CaO contained in grain like slag and/or rough grain like slag (including CaO and $Ca(OH)_2$ as needed) into $CaCO_3$ by the above mentioned carbonation reaction, consolidating the slag grain (when including the additives, grains of additives and slag) with a binder of $CaCO_3$, and making it massive.

The major parts of the slag contain a certain amount of MgO together with CaO. An artificial block where such slag is the raw material is produced by changing MgO or $Mg(OH)_2$ changed from MgO (including MgO and $Mg(OH)_2$ as needed) into $MgCO_3$ by the above mentioned carbonation reaction, consolidating the slag grain (when including the additives, grains of additives and slag) with a binder of $MgCO_3$ and $CaCO_3$, and making it massive.

Since an artificial block is made by closely consolidating $CaCO_3$ or $CaCO_3$ and $MgCO_3$ produced by a carbonation reaction of the slag of a small grain size, the strength is sufficient, and even if a shock is affected during transportation or when sinking it in the sea, while being laid in the sea bottom for a long period, there is almost no possibility that a crack or destruction will occur.

An artificial block may contain various kinds of additives (grain like or rough grain like additives) together with the grain like or rough grain like slag for providing suitable compositions in response to conditions of sea areas to be applied therewith. As the additives, enumerated are, for example, grain or rough grain (soluble silica, soluble silica containing material) to be a soluble silica source, grain or rough grain (oxidized iron, oxidized iron containing material) to be an oxidized iron source, or CaO of grain or rough grain. For containing CaO as the additive in the artificial block, it is necessary to leave CaO contained in slag or at least one part of CaO to be significantly contained in slag remaining as non-reacted CaO after the carbonation reaction.

The soluble silica or the oxidized iron contained in the artificial block is dissolved in the sea to usefully work to sustain the living of marine algae. If phosphorus is a cause of red tide or sulfur is a cause of blue tide are substantially contained in the sea bottom, CaO contained a bit in the sea immersion block absorbs these phosphorus or sulfur. As mentioned above, there is a problem of increasing the pH in the sea water if CaO is substantially contained in the block, however CaO is sufficient with a small amount of a degree remaining after the carbonation solidification for absorbing phosphorus or sulfur.

As grains or rough grains to be the soluble silica source, included are the soluble silica and/or the material containing the soluble silica of the grain or rough grain. As a material containing the soluble silica, fly ash or clinker ash may be used which are generated by coal combustion in such as a thermal power station. The fly ash contains soluble silica in an amount of 45 to 75 wt %, while the clinker ash contains 50 to 65-wt %.

The water granulated slag from a blast furnace also contains relatively much soluble silica, and if parts or all of the slag are rendered to be the water granulated slag, for example, if a slag by a steel making and the water granulated slag are mixed, a similar effect is brought about to the case of adding the additive to be a soluble silica source.

As the grain or the rough grain to be the oxidized iron source, included are grain like or rough grain like oxidized iron and/or an oxidized iron containing material, and in particular, cheaply available grain or rough grain are iron containing dusts generated in an iron-steel making process. The iron containing dust is generally a dust from iron making, and ordinarily contain oxidized iron of around 75% in terms of Fe. Mill scales also contain oxidized iron of around 70% in terms of Fe.

As mentioned above, when sinking blocks of a large specific gravity to the sea bottom such as a piling of sludge, the blocks are immersed into the sludge and cannot serve as algae places or fish gathering places. Therefore, with respect to the block material to be used for the sea bottom of piled sludge, it is preferable that a slag of relatively small specific gravity is a main raw material, and specifically, it is useful to use water granulated slag of a small specific gravity than that of other slag as at least one part of the main raw material.

The artificial block material is relatively porous, thereby bringing about the above mentioned effects. The percentage of voids is not especially limited, however normally, around 10 to 70% is a preferable percentage of voids.

The artificial block is produced through the same method as making the sea immersion block explained referring to FIGS. 5 to 8.

EXAMPLE 7

A mortar was poured into a molding frame of 1.5 m×1.5 m×1.5 m, and the solidified concrete block was divided into two by a breaker (rock drill) to produce blocks having fractured faces for the algae planting place for adherence.

One of the above blocks was transported to the sea of a natural algae planting place, put in a pulling-up net, and was temporarily laid in the algae planting place, turning upward the fractured face. A period of the seasons for sinking blocks was selected 9 months just before spending spores from the natural marine algae planting place in order that sedimentary substances did not cover the block surfaces before spores adhered thereto. After about one year, it could be confirmed that algae lived and rooted on the blocks surface, and the block was pulled up and transported to the algae planting place as the seeding material.

As the algae planting place, taking the water quality and the ocean current into consideration, a sea bottom of 4 m deep enough, separated from the existing algae place, was selected. In this place, 20 pieces of new blocks without adhering algae were immersed in the range of about 10 m diameter, turning the fractured faces upward, and at the center thereof, the above mentioned seeding materials were again immersed.

After about one year, when this algae planting place was surveyed, it was confirmed that all the blocks around the seeding blocks increased the fully living marine algae. The crop estimate by unit acreage sampling was carried out, and it was found that the marine algae of 521 g/m$^2$ in humid weight lived.

EXAMPLE 8

A converter slag grain like of a grain size of 3 mm or less, was piled 1.5 m in a pit of 4 m width×6 m depth, and moderately tightened, then the pit was closed and blown with carbon dioxide 50 Nm$^3$/hr for 3 days so as to solidify the slag. The carbonation-solidified slag was broken by heavy machinery to produce 15 pieces of the massive block materials having a size of about 1.0 m to 1.5 m for the seeding materials and the bases of the algae planting place.

One of the above blocks was transported to the sea of a natural algae planting place similar to that of the above mentioned EXAMPLE 3, put in a pulling-up net, and was temporarily laid in the algae planting place, turning upward the fractured face. A period of the seasons for sinking blocks was selected 9 months just before spending spores from the natural marine algae planting place in order that sedimentary substances did not cover the block surfaces before spores adhering thereto.

After about one year, it could be confirmed that algae lived and rooted on the block surface, and the block was pulled up and transported to the algae planting place as the seeding material.

As the algae planting place, the similar sea area and depth as the EXAMPLE 3 were selected. In this place, 14 pieces of new blocks without adhering algae were immersed in the range of about 10 m diameter, turning the fractured faces upward, and at the center thereof, the above mentioned seeding materials were again immersed.

After about one year, when this algae planting place was surveyed, it was confirmed that all the blocks around the seeding blocks increased the fully living marine algae. The crop estimate by unit acreage sampling was carried out, and it was found that the marine algae of 689 g/m$^2$ in humid weight lived.

According to the method of the invention, it is possible to select wide algae planting places, exactly create the algae places with less trouble and low cost, and to make algae places of a large scale.

INDUSTRIAL APPLICABILITY

According to the method of the invention, it is possible to efficiently absorb and remove on an industrial scale $CO_2$ of exhaust gas from such as an industrial process by using only an agglomerate of solid particles as slag or concrete which is easily available and of low cost. Assuming to use as a $CO_2$ absorbing agent (an agglomerate of solid particles) only steel making slag from the iron-steel slag generated in the iron making firms all over Japan, and assuming to apply the inventive method to exhaust gas generated in the iron making firms all over Japan, it is possible to curtail 1% of the amount of $CO_2$ generated. It may be said that this reducing amount of $CO_2$ corresponds to 10% of the target value of the above mentioned "a 10% reduction in comparison with 1990 of the energy consumption in the production process" of the self-imposed behavioral plan in the iron and steel business world, and corresponds to 24% in comparison with 1995. Thus, in this sense, this is a very epoch-making invention.

Further, not only in the reduction of $CO_2$ for industrial processes, but also by the method of the invention, it is possible to select wide algae planting places, exactly create the algae places with less trouble and at low cost, and to make algae places of a large scale.

What is claimed is:

1. A method for reducing the amount of carbon dioxide in an exhaust gas comprising:
    (a) preparing agglomerates of a slag generated in an iron and steel making process, said slag having a basicity of 1.2 or higher and containing at least one compound selected from the group consisting of CaO and $Ca(OH)_2$;
    (b) adding water and then carrying out an air wetting cure; and
    (c) contacting an exhaust gas containing $CO_2$ with the agglomerates of said slag in a reaction chamber, said slag having a film of adhesive water on a surface of said slag;
    whereby fixing $CO_2$ in the exhaust gas as $CaCO_3$ in said slag to reduce the amount of $CO_2$ in the exhaust gas.

2. The method according to claim 1, wherein the agglomerates of said slag are obtained by pulverizing materials containing CaO and/or $Ca(OH)_2$ into grain and/or rough grain.

3. The method according to claim 1, wherein the step (c) of contacting the exhaust gas with the agglomerates of said slag comprises contacting the exhaust gas containing $CO_2$ with the agglomerates of said slag by blowing the exhaust gas into the agglomerates of said slag.

4. The method according to claim 3, wherein the exhaust gas containing $CO_2$ is blown into the agglomerates of said slag from one direction.

5. The method according to claim 1, wherein the agglomerates of said slag have a water content of 3 wt. % to 20 wt. %.

6. The method according to claim 1, wherein said slag has a grain size of substantially 5 mm or less.

7. The method according to claim 1, wherein the exhaust gas introduced into the reaction chamber is at a temperature corresponding to the boiling point of water or lower, within the reaction chamber.

8. The method according to claim 1, wherein the reaction chamber is at a temperature corresponding to the boiling point of water or lower.

9. The method according to claim 1, wherein the agglomerates of said slag are at a temperature corresponding to the boiling point of water or lower, within the reaction chamber.

10. The method according to claim 1, wherein the step (c) of contacting the exhaust gas containing $CO_2$ with the agglomerates of said slag comprises contacting a pressurized exhaust gas with the agglomerates of said slag.

11. The method according to claim 1, further comprising saturating $H_2O$ in the exhaust gas, prior to contacting the exhaust gas with the agglomerates of said slag.

12. The method according to claim 1, wherein the agglomerates of said slag have a water content of 3 to 20 wt. %; and the exhaust gas is blown into the agglomerates of said slag, to contact the exhaust gas with the agglomerates of said slag.

13. The method according to claim 12, wherein the exhaust gas introduced into the reaction chamber is at a temperature corresponding to the boiling point of water or lower, within the reaction chamber; the reaction chamber is at a temperature corresponding to the boiling point of water or lower; and the agglomerates of said slag which are contacted with the exhaust gas is at a temperature corresponding to the boiling point of water or lower, within the reaction chamber.

14. The method according to claim 13, further comprising saturating $H_2O$ in the exhaust gas prior to contacting the exhaust gas with the agglomerates of said slag.

15. The method according to claim 1, wherein said slag has a grain size of 1 mm or less.

16. A method for reducing the amount of carbon dioxide in an exhaust gas comprising:
   (a) preparing agglomerates of a slag generated in an iron and steel making process, said slag having a basicity of 1.2 or higher;
   (b) adding water and then carrying out an air wetting cure;
   (c) mixing said slag with a material selected from the group consisting of a concrete, a mortar, a glass, an alumina cement and a CaO containing refractory, said material containing at least one compound selected from the group consisting of CaO and $Ca(OH)_2$; and
   (d) contacting an exhaust gas containing $CO_2$ with said mixture in a reaction chamber, said mixture having a film of adhesive water on a surface of said mixture;
   whereby fixing $CO_2$ in the exhaust gas as $CaCO_3$ in said mixture to reduce the amount of $CO_2$ in the exhaust gas.

* * * * *